(12) United States Patent
Mishina et al.

(10) Patent No.: US 7,568,215 B2
(45) Date of Patent: Jul. 28, 2009

(54) INFORMATION DISTRIBUTION SYSTEM

(75) Inventors: Yusuke Mishina, Kunitachi (JP); Kazuhisa Kaneko, Fujisawa (JP); Katsuaki Tanioka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 601 days.

(21) Appl. No.: 11/453,652

(22) Filed: Jun. 14, 2006

(65) Prior Publication Data

US 2007/0174882 A1 Jul. 26, 2007

(30) Foreign Application Priority Data

Jun. 17, 2005 (JP) ............................. 2005-177128

(51) Int. Cl.
*H04N 7/173* (2006.01)
(52) U.S. Cl. ...................... 725/116; 386/52; 348/207.2
(58) Field of Classification Search .................. 725/38, 725/61, 87, 93, 110, 116; 386/52; 348/207.2
See application file for complete search history.

(56) References Cited

U.S. PATENT DOCUMENTS

| | | | | |
|---|---|---|---|---|
| 6,363,525 | B1 * | 3/2002 | Dougherty et al. | 725/34 |
| 2002/0108115 | A1 * | 8/2002 | Palmer | 725/50 |
| 2002/0138843 | A1 * | 9/2002 | Samaan et al. | 725/87 |
| 2002/0157105 | A1 * | 10/2002 | Vienneau et al. | 725/105 |

FOREIGN PATENT DOCUMENTS

JP 2003-339040 11/2003

* cited by examiner

*Primary Examiner*—Christopher Kelley
*Assistant Examiner*—Sahar A Baig
(74) *Attorney, Agent, or Firm*—Townsend and Townsend and Crew LLP

(57) ABSTRACT

An object of the invention is to variously edit an image recorded in an image recording/viewing system in an image distribution system enabling a recorded image to be viewed using a mobile communication terminal via a fixed communication network or mobile network, such that a result of edition can be viewed alone or along with associated information, and thus, to enable high value-added image distribution. To accomplish the object, the invention provides an information distribution system, to which an image distribution terminal including a broadcast recording system and an image viewing terminal are connected via a communication network, wherein the image distribution terminal includes an image editing system for editing a recorded image, wherein an image edition meta information providing system for providing edition meta information required for the edition is connected to the communication network, and the image editing system edits a recorded image of the broadcast image, using the image edition meta information provided by the image edition meta information providing system, and provides the edited image to the image viewing terminal, in accordance with a viewing request from the image viewing terminal.

4 Claims, 9 Drawing Sheets

INFORMATION DISTRIBUTION SYSTEM

BACKGROUND OF THE INVENTION

1. Field of the Invention

The present invention relates to a technique for distributing information over a network. In particular, the present invention relates to an image distribution system (represented by a television broadcasting system) and image recording/playback system, a fixed communication system including a fixed communication network (represented by a fixed telephone network) of a base station and a terminal system, a mobile communication system including a mobile network (represented by a mobile telephone network) of a base station and a terminal system, and an information distribution system including a wide-area network (represented by the Internet). More particularly, this invention relates to a system for distributing image information broadcast by a television.

2. Description of the Related Art

A television broadcasting system may be cited as an image distribution system being most widely spread. The television broadcasting system is expected to hold its position as a representative of the image distribution system even in future owing to advanced communication system technologies including a digital broadcasting system and advanced image display technologies including a flat panel display. In addition, the spread of image recording/playback devices including a video recorder has made it possible to view a broadcast image at a free time irrespective of a broadcasting time. This new type of viewing is called "stock viewing". Particularly, the development of a video recorder containing a hard disk storage has enabled image recording/playback for a lengthy period of time. As a result, upon investigation, it was found that the stock viewing type will form the main stream of image viewing in future.

Meanwhile, the spread of mobile telephones has enabled the use of a two-way communication service at any place. Among mobile telephones, a product with a television image receiving function has also been developed to secure its position as a new image viewing device. The use of mobile telephones has also caused the advent of an image viewing style in a mobile environment.

Finally, there has also been a need for release from restrictions in the type of programs to be viewed. A video-on-demand system or rental video system has been spread as a method for requesting and viewing a favorite program. These systems are disclosed in Japanese Patent Laid-open Publication No. 2003-33904.

SUMMARY OF THE INVENTION

They recently have provided a technique for meeting a user's desire of viewing a favorite image freely at any time or place.

First, a video recorder enables stock-type broadcast program viewing, thereby realizing release from a time restriction. However, the video recorder must be connected to a television antenna. Further, the video recorder contains a mass storage unit, resulting in an increase in case size thereof. For this reason, the video recorder is a fixed-type information device, which is generally installed and used in a home. That is, program recording/viewing using the video recorder is disadvantageous in that it is short of mobility.

Meanwhile, a mobile telephone with a television receiving function cannot store mass image information due to restrictions in size or weight, so the use thereof is limited to only real-time broadcast reception. That is, program viewing using the mobile terminal has the disadvantage of being short of a degree of freedom in time.

Finally, a video-on-demand system can provide the maximum degree of freedom in association with the freedom degree of the program viewing. However, in the case where the video-on-demand system provides a video-on-demand service to a large number of users, the system must be large in scale and each user must pay a usage fee including a copyright fee per view. For this reason, there is a problem that complex system construction and management are required. On the other hand, where an image device capable of recording a large number of image programs, such as a video recorder with a hard disk, is spread, the substantial degree of freedom of the program viewing is significantly improved provided that a user can record a number of television programs suitable to his taste and freely select a desired television program to be viewed from among the recorded television programs. Moreover, it is general that the user does not need to pay a copyright fee of image information individually possessed by himself as long as only he uses it.

To sum up, in a conventional video recorder, mobile telephone or video-on-demand system, there is a problem that it is not possible for a user to view an image freely at any time or place.

According to the present invention, this problem can be overcome by the provision of a system for enabling the user to view an image with a high degree of freedom irrespective of restrictions in time or place.

As a first means for solving the above-mentioned problems, an information distribution system is provided which comprises:

a broadcast image distribution system for transmitting a broadcast image;

a broadcast image recording/viewing system for receiving the transmitted broadcast image, and recording the received broadcast image as a recorded image;

an image editing system for editing the recorded image;

a communication network;

a communication base station connected to the communication network, to provide communication services;

a communication terminal system connected to the communication network, to receive the communication services; and an image edition meta information providing system connected to the communication network, the image edition meta information providing system including an image edition meta information management table, to store predetermined meta information as to edition of the broadcast image, and providing the predetermined meta information after reading the predetermined meta information from the table, wherein the broadcast image recording/viewing system is connected to the communication network, wherein the image editing system is connected to the communication network, wherein the communication terminal system transmits a recorded image transmission request to the broadcast image recording/viewing system via the communication network, wherein, after receiving the recorded image transmission request, the broadcast image recording/viewing system transmits the transmission-requested recorded image to the image editing system, wherein, after receiving the recorded image transmission request, the broadcast image recording/viewing system transmits, to the image edition meta information providing system, an image edition meta information transmission request for requesting the image edition meta information providing system to transmit image edition meta information corresponding to the transmission-requested recorded image to the image editing system, wherein, after receiving the image edition meta information transmission request, the image edition meta information providing system transmits the transmission-requested image edition meta information to the image editing system, wherein, after receiving the transmitted recorded image and the transmitted image edition meta information, the image editing system edits the received recorded image, based on the received image edition meta information, and transmits a resultant edited image obtained as a result of the edition to the communication terminal system, as a response to the recorded image transmission request.

In accordance with the above-described configuration, the contractor of the mobile network can view any image in a broadcast image recording/viewing system connected to a fixed communication network, from a communication terminal system connected to the mobile network via the fixed communication network, in a state in which a certain edition processing has been carried out for the image. In the above-described configuration, the image viewed by the contractor is an image recorded by the contractor himself, differently from a general image distribution system. Thus, there is an advantage in that there is no payment of copyright or use fee because the image viewed by the contractor is not an image distributed by other company.

As a second means for solving the above-mentioned problems, an information distribution system is provided which comprises:

a broadcast image distribution system for transmitting a broadcast image;

a broadcast image recording/viewing system for receiving the transmitted broadcast image, and recording the received broadcast image as a recorded image;

an image editing system for editing the recorded image;

a communication network;

a communication base station connected to the communication network, to provide communication services;

a communication terminal system connected to the communication network, to receive the communication services; and an image edition meta information providing system connected to the communication network, the image edition meta information providing system including an image edition meta information management table, to store predetermined meta information as to edition of the broadcast image, and providing the predetermined meta information after reading the predetermined meta information from the table, wherein the broadcast image recording/viewing system is connected to the communication network, wherein the image editing system is connected to the communication network;

wherein the communication terminal system transmits a recorded image transmission request to the broadcast image recording/viewing system via the communication network, wherein, after receiving the recorded image transmission request, the image edition meta information providing system transmits, to the image editing system, image edition meta information corresponding to the transmission-requested recorded image;

wherein, after receiving the recorded image transmission request, the image edition meta information providing system transmits, to the broadcast image recording/viewing system, a recorded image transmission request for requesting for transmission of the transmission-requested recorded image to the image editing system, wherein, after receiving the recorded image transmission request, the broadcast image recording/viewing system transmits the transmission-requested recorded image to the image editing system, wherein, after receiving the transmitted recorded image and the transmitted image edition meta information, the image editing system edits the received recorded image, based on the received image edition meta information, wherein a resultant edited image obtained as a result of the edition is transmitted to the communication terminal system, as a response to the recorded image transmission request.

In accordance with the above-described configuration, the image edition meta information providing system can send the image edition meta information associated with the transmission-requested recorded image to the image editing system within a further reduced time. Accordingly, it is possible to reduce the response time of the entire system.

As a third means for solving the above-mentioned problems, an information distribution system is provided which comprises the first means or the second means, wherein predetermined meta information as to edition of the broadcast image includes position information or time information associated with one or plural image portions of the image, the position information or time information specifying the associated image portion or image portions.

In accordance with the above-described configuration, the image editing system can efficiently edit the recorded image of the broadcast image recording/viewing system.

As a fourth means for solving the above-mentioned problems, an information distribution system is provided which comprises the first means or the second means, wherein one or plural broadcast image recording/viewing systems for recording the received broadcast image as a recorded image are present, wherein the one broadcast image recording/viewing system or each of the plural broadcast image recording/viewing systems collects predetermined viewing type meta information as to the viewing type (viewing start position, viewing end position, number of views, fast forward start position, fast forward end position, rewind start position, rewind end position, etc.), and includes a viewing type meta information management table for storing the collected viewing type meta information, wherein the one broadcast image recording/viewing system or each of the plural broadcast image recording/viewing systems transmits the viewing type meta information read from the viewing type meta information management table via the communication network, wherein, after receiving the transmitted viewing type meta information, the image edition meta information providing system sequentially stores the received viewing type meta information in the image edition meta information management table, wherein, after storing the viewing type meta information, the image edition meta information providing system pays to a user providing the viewing type meta information for the provision of the information, wherein, after storing the viewing type meta information, the image edition meta information providing system executes predetermined image edition meta information preparation processing, using one or plural viewing type meta information of the image edition meta information management table, to prepare predetermined meta information as to edition of the broadcast image.

In accordance with the above-described configuration, in association with the recorded image, which is an object to be edited, it is possible to prepare image edition meta information capable of creating image portions securing a large number of viewers, namely, highly-favorable image portions, as a result of the edition.

As a fifth means for solving the above-mentioned problems, an information distribution system is provided which comprises the first means or the second means, wherein the transmitted broadcast image additionally includes one or plural advertising images, wherein the image edition meta information providing system includes a broadcast image meta information management table including, as the predetermined meta information, the broadcast image meta information and the meta information of the additional advertising image or images for each broadcast image, in addition to the image edition meta information management table, wherein the image edition meta information providing system includes a communication service contractor meta information management table for storing meta information (sex, age, etc.) of a communication service contractor associated with the communication terminal system, wherein, after receiving the recorded image transmission request, the image edition meta information providing system reads, from the communication service contractor meta information management table, meta information of the communication service contactor associated with the communication terminal system, from which the recorded image transmission request has been transmitted, wherein the image edition meta information providing system reads the meta information of the advertising image or images from the broadcast image meta information management table for the broadcast image corresponding to the transmission-requested recorded image, wherein the image edition meta information providing system includes a meta information combination determination processor for determining whether or not the meta information of the read advertising image or images and the meta information of the communication service contactor are in an appropriately combined state, wherein the image edition meta information providing system executes predetermined image edition meta information preparation processing, using a result of the determination executed by the meta information combination determination processor, to prepare predetermined meta information associated with the broadcast images.

In accordance with the above-described configuration, the contractor can freely vary the contents of advertising images added to the recorded image during broadcasting, when the contractor views the recorded image through the mobile communication terminal after transmitting the recorded image to the mobile communication terminal. Accordingly, it is possible to add an advertising image having a content according to the attribute of the viewer or the situation of the viewed scenes.

As a sixth means for solving the above-mentioned problems, an information distribution system is provided which comprises the fifth means, wherein the broadcast image meta information providing system includes an advertising cost calculation processor for calculating advertising costs for the prepared predetermined meta information associated with broadcast images, based on meta information of advertising image portions included in the meta information.

In accordance with the above-described configuration, the broadcast image meta information providing system can demand, to an advertiser of the advertising images, payment for the distribution of advertising images not achieved during broadcasting of images, but achieved during viewing of recorded images. Accordingly, many companies can share the system operating costs. Thus, it is possible to achieve a reduction in the cost burden of the companies or contractors.

As a seventh means for solving the above-mentioned problems, an information distribution system is provided which comprises the first means or the second means, wherein the communication network comprises a fixed communication network and a mobile network, wherein the communication terminal system is a mobile communication terminal system of the mobile network, wherein the communication base station is a fixed communication base station of the fixed communication network, wherein the information distribution system comprises an inter-communication network link system for relaying communication data between the fixed communication network and the mobile network, wherein the inter-communication network link system instructs transmission of the recorded image transmission request from the mobile network to the fixed communication network, wherein the inter-communication network link system instructs transmission of the response to the recorded image transmission request from the fixed communication network to the mobile network, wherein the inter-communication network link system cuts off communication access to the broadcast image recording/viewing system connected to the fixed communication network, except for communication access to the mobile communication terminal system connected to the mobile network.

In accordance with the above-described configuration, it is possible to enhance the security of the entire system because it is possible to cut off access to the broadcast image recording/viewing system connected to the fixed communication network by mobile communication terminal systems other than the mobile communication terminal system of the communication contractor and fixed communication terminal systems.

As an eighth means for solving the above-mentioned problems, an information distribution system is provided which comprises the first means or the second means, wherein the information distribution system comprises a net information providing system connected to the communication network, to provide various information, wherein the image edition meta information providing system includes, in addition to the image edition meta information preparing system, a net information searching/analyzing system for performing search for and analysis of information provided by the net information providing system, wherein a net information searching/editing system capable of searching the net information providing system is connected to the fixed communication terminal system, wherein the net information searching/analyzing system includes a net information searing system for searching the net information providing system for associated information, using keywords in a broadcast image meta information table provided from the image edition meta information preparing system, wherein meta information of the net information as a result of the search (name of the associated information, address information, keywords, etc.) is stored in a net information meta information management table, wherein the associated information name of the stored net information meta information, and a program name of the broadcast image meta information table provided from the image edition meta information preparing system are stored in the net information-associated information management table in a co-related state, wherein the image edition meta information preparing system prepares image edition meta information corresponding to the transmission-requested recorded image, using the net information-associated information management table and the net information meta information table, and sends the prepared image edition meta information to the image editing system of the fixed communication terminal system, wherein, after receiving the transmitted recorded image and the transmitted image edition meta information, the image editing system runs the net information searching/editing system, using the received image edition meta information, to search for net information, and edits the searched net information and the received recorded image, wherein a resultant edited image as a result of the edition is transmitted to the mobile communication terminal system as a response to the recorded image transmission request.

In accordance with the above-described configuration, the contractor of the mobile network can freely refer to various net information associated with the recorded image viewed through the mobile communication terminal system, in the mobile communication terminal system.

As a ninth means for solving the above-mentioned problems, an information distribution system is provided which comprises:

a broadcast image distribution system for transmitting a broadcast image;

a broadcast image recording/viewing system for receiving the transmitted broadcast image;

a fixed communication base station connected to a fixed communication network, to provide fixed communication services;

a fixed communication terminal system connected to the fixed communication network, to receive the fixed communication services, a wireless communication base station connected to a wireless communication network, to provide wireless communication services;

a wireless communication terminal system connected to the wireless communication network, to receive the wireless communication services; and a wide-area network, wherein the mobile communication base station is connected to the wide-are network via a mobile network gateway, wherein the fixed communication base station is connected to the wide-are network via a fixed communication network gateway, wherein an inter-communication company link system for linking the mobile network and the fixed communication network is connected to the wide-area network, wherein the inter-communication link system receives an inter-company link service connection request transmitted from the mobile communication terminal system, via the mobile network gateway and the wide-area network, wherein the inter-communication company link system includes a mobile communication terminal system authentication processor which is a source of the received inter-communication company link service connection request, wherein the inter-communication company link system includes a mobile communication terminal system relay processor for determining an identification number of the fixed communication network gateway, to which the mobile communication terminal system is connectable, an identification number of the fixed communication base station, and an identification number of the fixed communication terminal system, using a mobile network gateway identification number contained in a connection request authenticated by the mobile communication terminal system authentication processor.

In accordance with the above-described configuration, only the mobile communication terminal system of the communication contractor can be connected to the broadcast image recording/viewing system connected to the fixed communication network. Accordingly, it is possible to enhance the security of the entire system.

As a tenth means for solving the above-mentioned problems, an information distribution system is provided which comprises the ninth means, wherein the broadcast image recording/viewing system is connected to the fixed communication terminal system, wherein the broadcast image recording/viewing system records index information of the recorded image, wherein the mobile communication terminal system transmits, to the inter-company link system, a first recording program list information request for requesting transmission of information of a name list of programs recorded by the broadcast image recording/viewing system, wherein the transmitted first recorded program list information request is received by the inter-communication company link system via the mobile network, the mobile communication base station, the mobile network gateway, and the wide-are network, wherein the inter-communication company link system prepares a second recorded program list information request, using the received first recorded program list information request, wherein the inter-communication company link system transmits the prepared second recorded program list information request to the connectable fixed communication network gateway, the fixed communication base station, and the fixed communication terminal system, wherein the transmitted second recorded program list information request is received by the fixed communication terminal system via the wide-area network, the fixed communication network gateway, the fixed communication base station, and the fixed communication network, wherein the fixed communication terminal network transmits the received second recorded program list information request to the broadcast image recording/viewing system, wherein, after receiving the transmitted second recorded program list information request, the broadcast image recording/viewing system reads, from a recorded image meta information management table, meta information of the image recorded by the broadcast image recording/viewing system, and prepares a response to the second recorded program list information request, based on the read meta information, wherein the prepared second recorded program list information response is transmitted to the inter-communication company link system via the fixed communication terminal system, the fixed communication network, the fixed communication base station, the fixed communication network gateway, and the wide-area network, wherein the inter-communication company link system prepares a response to the first recorded program list information request, using the transmitted second recorded program list information response, wherein the inter-communication company link system transmits the prepared first recorded program list information response to the mobile communication terminal system which is a transmission source of the request, wherein the transmitted first recorded program list information response is received by the mobile communication terminal system as the request transmission source via the wide-area network, the mobile network gateway, the mobile communication base station, and the mobile network, wherein the mobile communication terminal system displays the information of the name list of the recorded programs, based on the received first recorded program list information response.

In accordance with the above-described configuration, the mobile communication contractor can freely refer to the list of broadcast images recorded in the broadcast image recording/viewing system, using the mobile communication terminal system. Accordingly, the convenience of the system is enhanced.

As an eleventh means for solving the above-mentioned problems, an information distribution system is provided which comprises the ninth means, wherein one recorded image is selected from the recorded program name list information displayed by the mobile communication terminal system, and a first recorded image transmission request for requesting transmission of the selected recorded image is prepared, wherein the mobile communication terminal system transmits the first recorded image transmission request to the inter-communication link system, wherein the transmitted first recorded image transmission request is received by the inter-communication company link system via the mobile network, the mobile communication base station, the mobile network gateway, and the wide-are network, wherein the inter-communication company link system prepares a second recorded image transmission request, using the received first recorded image transmission request, wherein the inter-communication company link system transmits the prepared second recorded image transmission request to the connectable fixed communication network gateway, the fixed communication base station, and the fixed communication terminal system, wherein the transmitted second recorded image transmission request is received by the fixed communication terminal system via the wide-area network, the fixed communication network gateway, the fixed communication base station, and the fixed communication network, wherein the fixed communication terminal system transmits the received second recorded image transmission request to the broadcast image recording/viewing system, wherein, after receiving the transmitted second recorded image transmission request, the broadcast image recording/viewing system reads the image recorded by the broadcast image recording/viewing system, and prepares a response to the second recorded image transmission request, based on the read image, wherein the prepared second recorded image transmission response is transmitted to the inter-communication company link system via the fixed communication terminal system, the fixed communication network, the fixed communication base station, the fixed communication network gateway, and the wide-area network, wherein the inter-communication company link system prepares a response to the first recorded image transmission request, using the transmitted second recorded image transmission response, wherein the inter-communication company link system transmits the prepared first recorded image transmission response to the mobile communication terminal system which a transmission source of the request, wherein the transmitted first recorded image transmission response is received by the mobile communication terminal system as the request transmission source via the wide-area network, the mobile network gateway, the mobile communication base station, and the mobile network, wherein the mobile communication terminal system displays the information of the recorded image, based on the received first recorded image transmission response.

In accordance with the above-described configuration, the contractor of the mobile network can view any image in a broadcast image recording/viewing system connected to a fixed communication network, from a communication terminal system connected to the mobile network via the fixed communication network, in a state in which a certain edition processing has been carried out for the image.

As a twelfth means for solving the above-mentioned problems, an information distribution system is provided which comprises the eleventh means, wherein a mobile-communication-side image transmitting system is connected to the mobile network gateway and the mobile communication base station, wherein a fixed-communication-side image transmitting system is connected to the fixed communication network gateway and the fixed communication base station, wherein the inter-communication company link system instructs the mobile-communication-side image transmitting system connected to the mobile network gateway, which has transmitted the authenticated connection request, and the fixed-communication-side image transmitting system connected to the connectable fixed communication network gateway to establish an image-transmission-dedicated communication line having a predetermined communication quality between the image transmitting systems, wherein, after receiving the second recorded image transmission request, the broadcast image recording/viewing system reads a recorded image designated by the second recorded image transmission request, and prepares a third image transmission request, which is to use the established image-transmission-dedicated communication line, based on the read image, wherein the prepared third recorded image transmission request is transmitted to the fixed-communication-side image transmitting system via the fixed communication terminal system, the fixed communication network, and the fixed communication base station, wherein the fixed-communication-side image transmitting system transmits the transmitted recorded image transmission request to the mobile-communication-side image transmitting system connected to the mobile network gateway as a transmission source of the request, via the image-transmission-dedicated communication line, wherein the mobile-communication-side image transmitting system transmits the received third recorded image transmission request to the mobile communication terminal system, which is a transmission source of the first image transmission request, via the mobile communication base station and the mobile network, wherein the mobile communication terminal system displays the recorded image, using the received third image transmission request.

In accordance with the above-described configuration, the contractor of the mobile network can view any image in a broadcast image recording/viewing system connected to a fixed communication network, from a communication terminal system connected to the mobile network via the fixed communication network, in the form of a high-quality stream image within a short response time.

An information distribution system is also provided which comprises:

a broadcast image distribution system for transmitting a broadcast image;

a broadcast image recording/viewing system for receiving the transmitted broadcast image, and recording the received broadcast image as a recorded image;

an image editing system for editing the recorded image;

a communication network;

a communication base station connected to the communication network, to provide communication services;

a communication terminal system connected to the communication network, to receive the communication services; and an image edition meta information providing system connected to the communication network, the image edition meta information providing system including an image edition meta information management table, to store predetermined meta information as to edition of the broadcast image, and providing the predetermined meta information after reading the predetermined meta information from the table on the communication network, wherein the broadcast image recording/viewing system is connected to the communication network, wherein the image editing system is connected to the communication network;

wherein the communication terminal system transmits an image edition meta information transmission request to the image edition meta information providing system via the communication network, wherein, after receiving the image edition meta information transmission request, the image edition meta information providing system transmits the transmission-requested mage edition meta information to the communication terminal system, wherein the communication terminal system transmits a recorded image transmission request to the broadcast image recording/viewing system, wherein, after receiving the recorded image transmission request, the broadcast image recording/viewing system transmits the transmission-requested recorded image to the image editing system, wherein, after receiving the transmitted recorded image and the transmitted image edition meta information, the image editing system edits the received recorded image, based on the received image edition meta information, wherein a resultant edited image obtained as a result of the edition is transmitted to the broadcast image recording/viewing system, as a response to the recorded image transmission request, such that the resultant edited image is viewable.

In accordance with the above-described configuration, the broadcast recording/viewing system enables selection of edited images of various types and viewing of the selected images.

In accordance with the present invention, the user can implement a system capable of enabling the user to freely view a recorded image while performing image edition processing, if necessary, without restriction on time and place, using a mobile communication terminal system connected to a mobile network. Since the user views an image recorded by him, there is an advantage in that an additional cost burden such as payment for copyright is not required in association with the viewing of recorded images. The user can also view information variously edited in accordance with the situation by the provision of a system for preparing image edition meta information to be used for the image edition processing, and distributing the prepared image edition meta information. It is also possible to prepare high value-added image edition meta information reflecting intentions of many users by acquiring meta information as to the viewing types of the users, and collecting the acquired meta information in the image edition meta information preparing/distributing system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
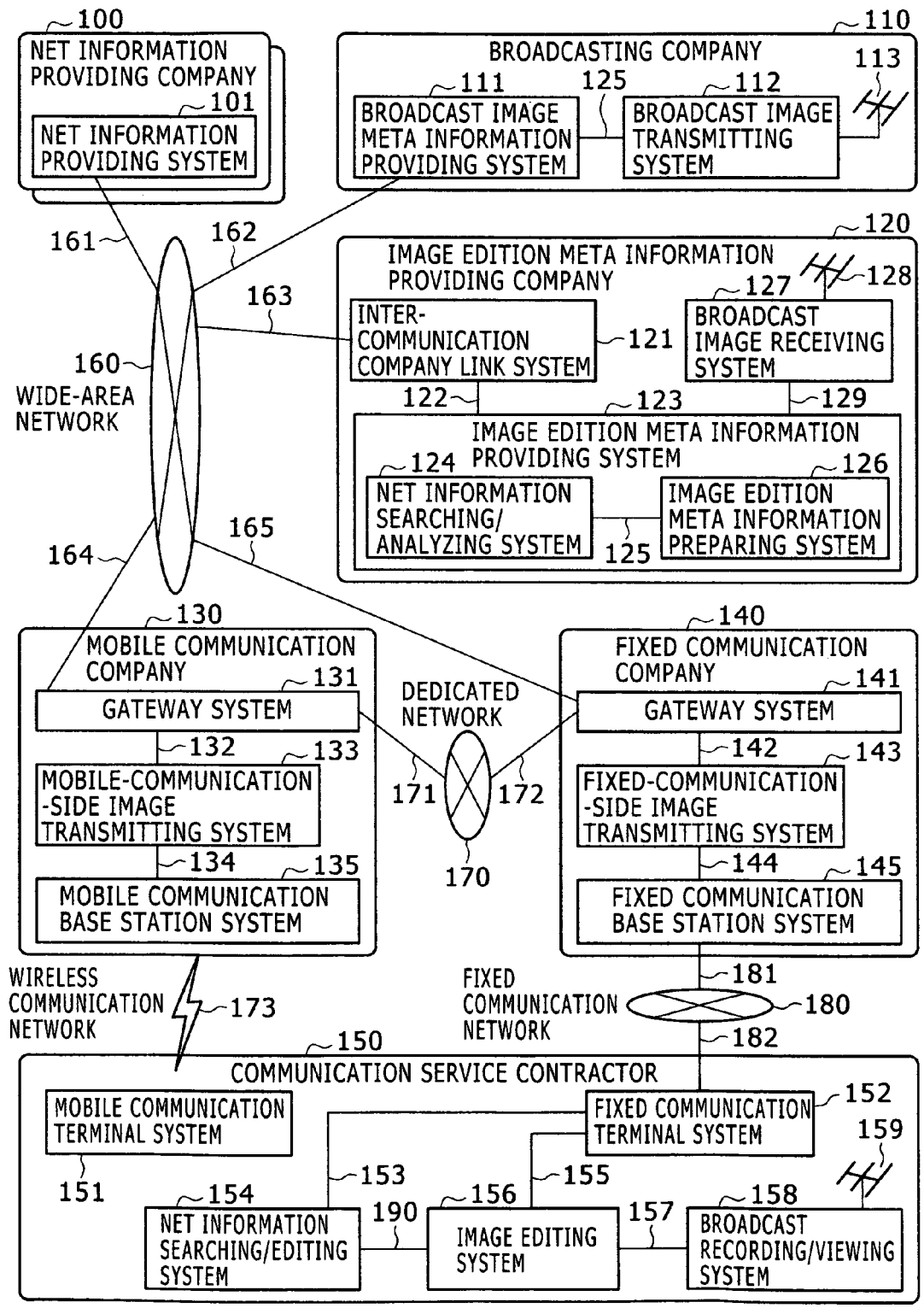
FIG. 1 is a block diagram showing the configuration of an information distribution system according to the present invention.

FIG. 1 shows the configuration of an information distribution system according to the present invention. First, the outline of the information distribution system according to the present invention will be described with reference to FIG. 1. Each system shown in FIG. 1 may be a so-called computer for executing predetermined information processing, which basically includes a storage unit for storing a program and other information, a processor for processing the information according to the program, and a memory connected to the processor along a predetermined path.

This information distribution system comprises a net information providing company 100 represented by a Web server on the Internet, a broadcasting company 110 for distributing a broadcast image, a mobile communication company 130 represented by a mobile telephone, a fixed communication company 140 represented by the combination of an Internet service provider and a fixed telephone, a communication service contractor 150 for receiving a mobile communication service from the mobile communication company 130 or a fixed communication service from the fixed communication company 140, and an image edition meta information providing company 120 peculiar to the present invention.

The communication service contractor 150, which is a user of the present information distribution system, has a broadcast image recording/viewing, system 158 represented by a television or video recorder for receiving, recording and viewing the broadcast image from the broadcasting company 110, a mobile communication terminal system 151 represented by a mobile telephone, which is a terminal system of the mobile communication service, and a fixed communication terminal system 152 represented by a personal computer, which is a terminal system of the fixed communication service.

According to this information distribution system, the communication service contractor can "freely" view a broadcast image recorded in a video recorder in a home using a mobile telephone outside of the home. In detail, the term "freely" means the provision of a special playback function, such as Play/Stop or Fast-Forward/Rewind, beginning with a designated portion of a desired one of a plurality of recorded images. It also means the provision of a group of functions of enabling efficient image viewing in a mobile environment, such as viewing a highlight scene or digest image of a sports relay broadcast, viewing only an image portion of a specific theme of a news program, or providing net information associated with the image recorded in the video recorder.

In order to enable the free viewing, the information distribution system has the following characteristics. First, the communication service contractor 150 has an image editing system 156. The image editing system 156 edits a broadcast image recorded by the image recording/viewing system 158 according to meta information for image edition provided from the image edition meta information providing company 120. Image information as a result of the edition is delivered to the mobile communication terminal system 151 through the fixed communication terminal system 152, fixed communication company 140 and mobile communication company 130.

The image edition meta information providing company 120 has an image edition meta information providing system 123 for preparing meta information necessary for edition of a digest image or highlight image of a broadcast image, or meta information necessary for reference to other net information associated with the image information.

The image edition meta information providing system 123 receives the broadcast image from the broadcasting company 110 using a broadcast image receiving system 127. The image edition meta information providing system 123 also acts to, using an image edition meta information preparing system 126, analyze the received broadcast image and prepare image processing meta information for edition of a digest image or highlight image of the received broadcast image according to a result of the analysis. The image edition meta information preparing system 126 prepares the image edition meta information by utilizing viewing type information acquired by the broadcast image recording/viewing system 158 of the communication service contractor 150 as an input of the analysis. The image edition meta information providing system 123 also acts to retrieve and analyze net information associated with the broadcast image from an information service system on a wide-area network using a net information searching/analyzing system 124 and prepare the image edition meta information according to a result of the analysis.

As described above, in the information distribution system of the present invention, the image edition meta information providing process and the image editing process are performed independent of each other, thereby making it possible to provide a high value-added image based on image reconstruction under the condition of meeting copyright restrictions. The above is the outline of the information distribution system according to the present invention. Hereinafter, a description will be given of information distribution processing flows of the information distribution system.

First, a detailed description will be given of a first information distribution processing flow of the information distribution system shown in FIG. 1, which is a first embodiment of the information distribution system according to the present invention. First, a basic recording, connection and transmission processing flow of the first embodiment will be described in detail with reference to FIG. 2 and, as needed, FIG. 1, FIG. 8 and FIG. 9.

Figure 2:
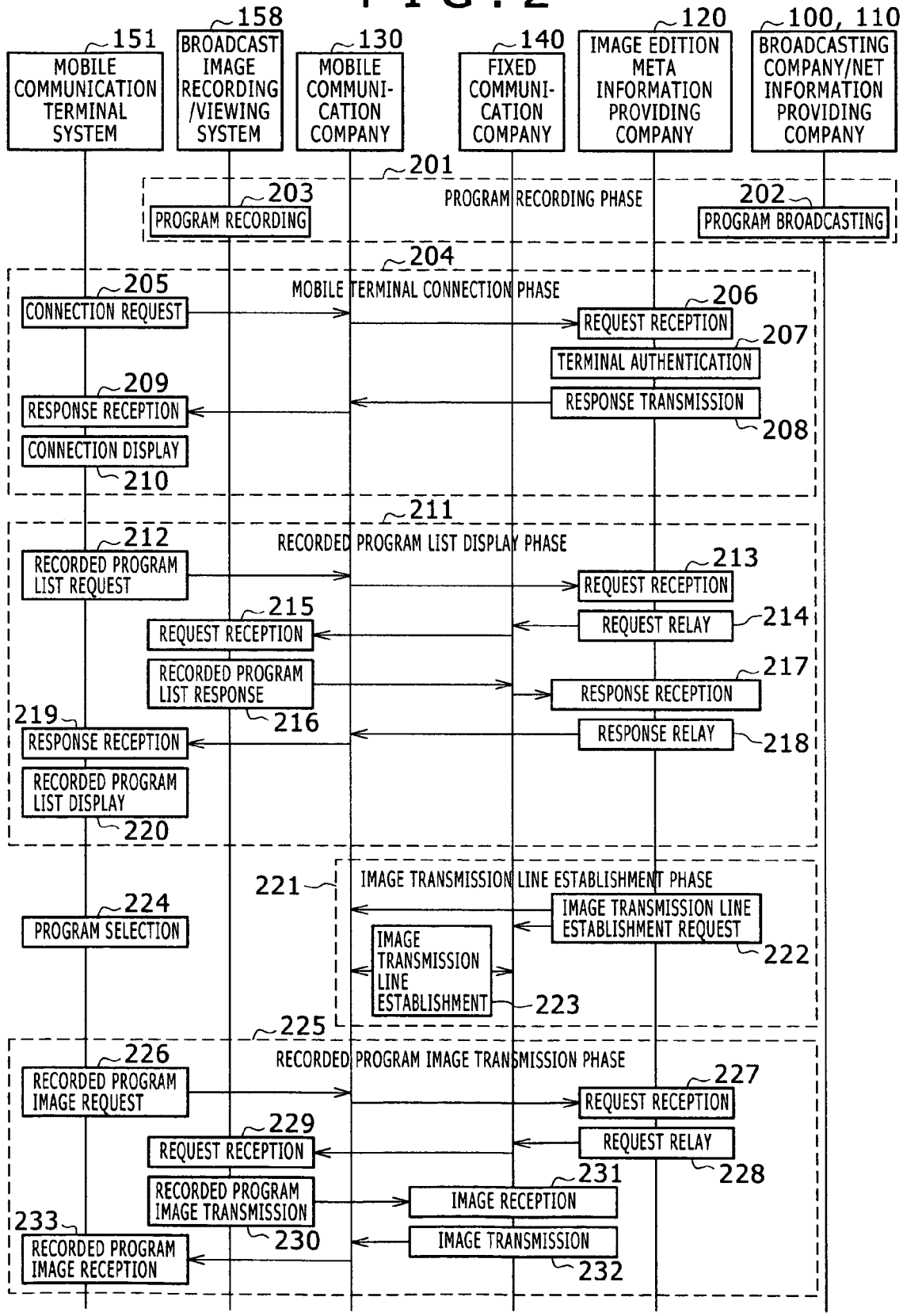
FIG. 2 is a recording, connection and transmission processing flow chart of a first embodiment of the information distribution system according to the present invention.
Figure 8:
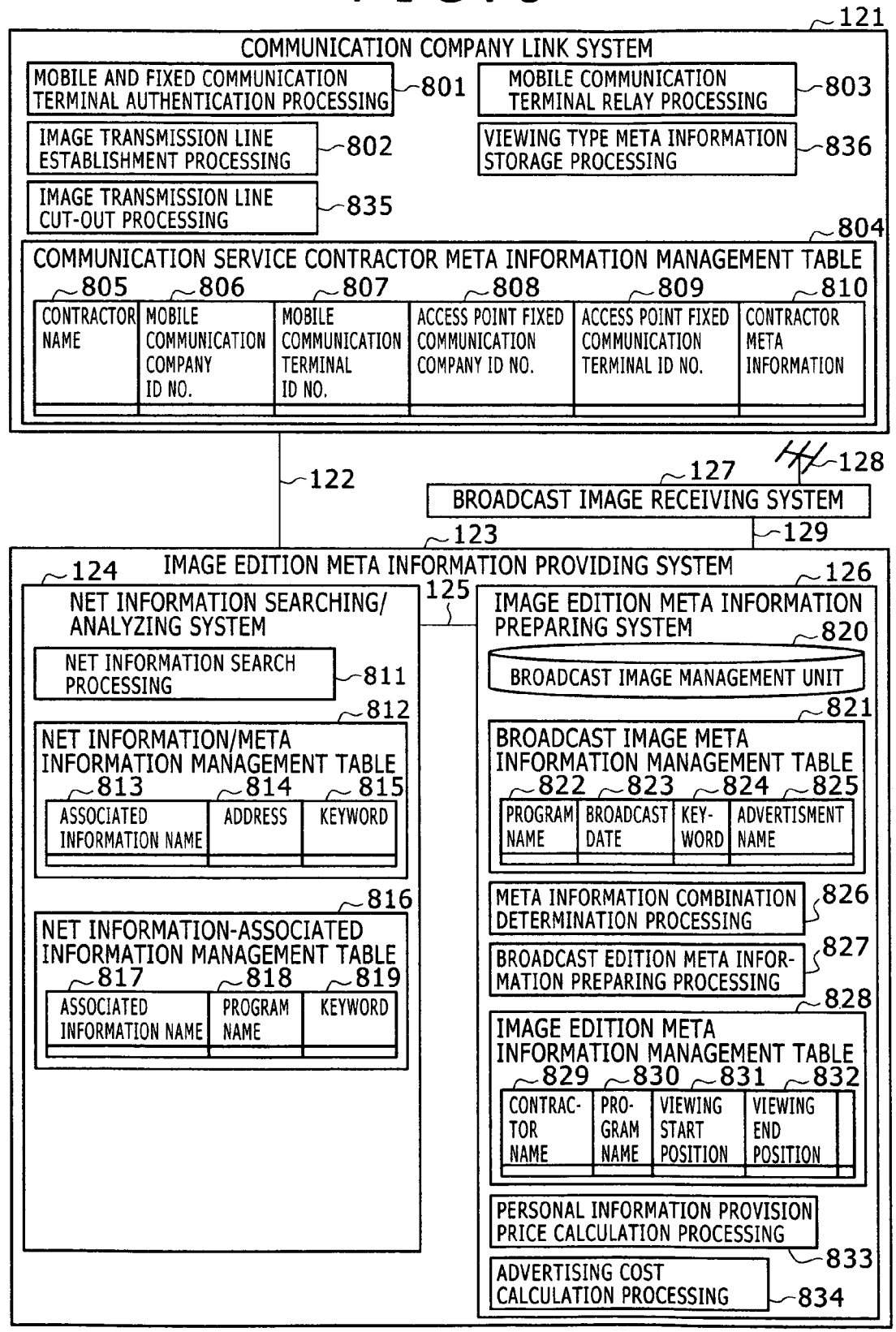
FIG. 8 is a block diagram showing the system configuration of an image edition meta information providing company.
Figure 9:
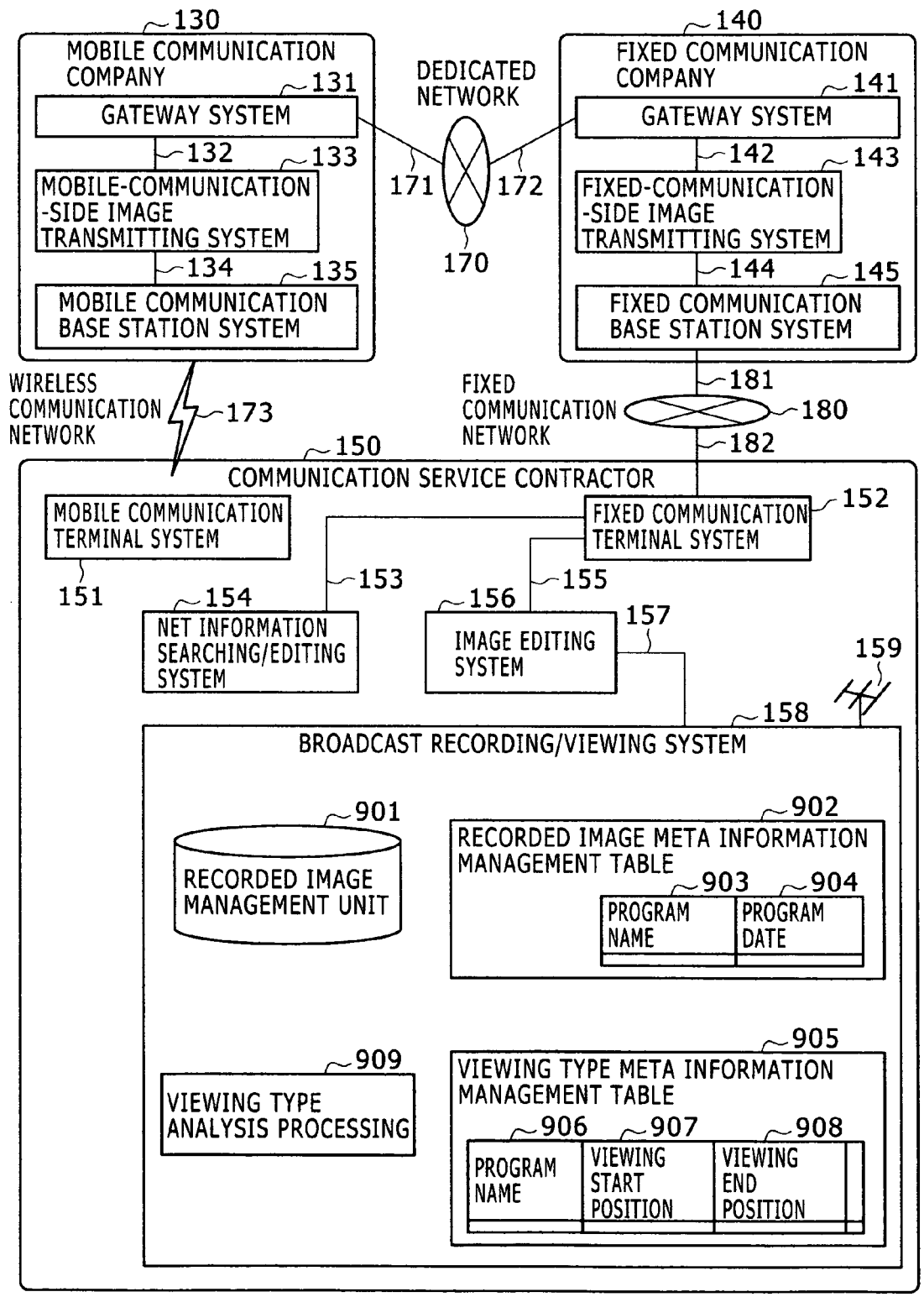
FIG. 9 is a block diagram showing the system configuration of a communication service contractor.

FIG. 2 shows the flow of information transmitted and received among the systems and companies constituting the information distribution system of the present invention in processing order along a time axis. FIG. 8 is a detailed block diagram of the system configuration of the image edition meta information providing company 120 in the information distribution system of the present invention shown in FIG. 1.

First, at a first phase, the communication service contractor 150 records a broadcast image using the broadcast image recording/viewing system 158 (program recording phase 201). In detail, the broadcasting company 110 broadcasts an image using a broadcast image transmitting system 112 and an antenna 113 (Step 202). The broadcast image is received to the broadcast image recording/viewing system 158 of the communication service contractor 150 via an antenna 159 and then recorded thereby (Step 203).

Then, at a second phase, the communication service contractor 150 performs a connection to the present information distribution system using the mobile communication terminal system 151 (mobile communication terminal connection phase 204). In detail, the mobile communication terminal system 151 transmits a connection request toward an inter-communication company link system 121 of the image edition meta information providing company 120 (Step 205). This connection request is delivered via a wireless communication network 173, a mobile communication base station system 135, a data path 134, a data path 132, a gateway system 131, a data path 164, a wide-area network 160, and a data path 163, and then received to the inter-communication company link system 121 of the image edition meta information providing company 120 (Step 206). Upon receiving the connection request, the inter-communication company link system 121 runs a mobile and fixed communication terminal authentication processor 801 to perform a terminal authentication (Step 207).

The mobile and fixed communication terminal authentication processor 801 searches a communication service contractor meta information management table 804 in the inter-communication company link system 121 by utilizing, as keys, a mobile communication company identification (ID) number 806 and mobile communication terminal ID number 807 included in the connection request, to acquire mobile communication terminal system authentication information, which is a portion of contractor meta information 810 stored in the table, and authenticates the mobile communication terminal system 151 using the acquired authentication information. Various conventional methods, including a public key certificate, are applicable to the authentication information and no further description thereof will thus be given.

If this authentication process is completed, the inter-communication company link system 121 transmits the authentication result toward the mobile communication terminal system 151 as a response to the connection request (Step 208). The transmitted response is received to the mobile communication terminal system 151 via the data path 163, wide-area network 160, data path 164, gateway system 131, data path 132, data path 134, mobile communication base station system 135 and wireless communication network 173 (Step 209), and whether the connection has been successfully performed is displayed thereby (Step 210).

If the connection has been successfully performed, at a third phase, the communication service contractor 150 requests display of a list of recorded programs using the mobile communication terminal system 151 (recorded program list display phase 211). In detail, the mobile communication terminal system 151 transmits a recorded program list request toward the inter-communication company link system 121 of the image edition meta information providing company 120 (Step 212). This recorded program list request is delivered via the wireless communication network 173, mobile communication base station system 135, data path 134, data path 132, gateway system 131, data path 164, wide-area network 160 and data path 163, and then received to the inter-communication company link system 121 of the image edition meta information providing company 120 (Step 213). Upon receiving the recorded program list request, the inter-communication company link system 121 runs a mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded program list request, to acquire an access point fixed communication company ID number 808 and access point fixed communication terminal ID number 809 stored in the table. Then, the mobile communication terminal relay processor 803 sets the two ID numbers, which are the search results, as source information of the recorded program list request and transmits the recorded program list request toward the fixed communication terminal system 152 (Step 214). The transmitted request is received to the fixed communication terminal system 152 via the data path 163, the wide-area network 160, a data path 165, a gateway system 141, a data path 142, a data path 144, a fixed communication base station system 145, a data path 181, a fixed communication network 180, and a data path 182. Upon receiving the recorded program list request, the fixed communication terminal system 152 transmits this request toward the broadcast image recording/viewing system 158 according to a different protocol, and the transmitted request is received to the broadcast image recording/viewing system 158 via a data path 155 and a data path 157 (Step 215). Upon receiving this request, the broadcast image recording/viewing system 158 reads meta information including program names 903 and broadcast dates 904 of recorded images from a recorded image meta information management table 902. The broadcast image recording/viewing system 158 then transmits the read recorded image meta information as a response to the recorded program list request transmitted according to the different protocol (Step 216). The fixed communication terminal system 152 receives the transmitted response via the data path 157 and data path 155 and transmits the received recorded image meta information toward the inter-communication company link system 121 as a response to the recorded program list request. This recorded program list response is delivered via the data path 182, fixed communication network 180, data path 181, fixed communication base station system 145, data path 144, data path 142, gateway system 141, data path 165, wide-area network 160 and data path 163 and then received to the inter-communication company link system 121 of the image edition meta information providing company 120 (Step 217). Upon receiving the recorded program list response, the inter-communication company link system 121 transmits this recorded program list response toward the mobile communication terminal system 151 of the communication service contractor 150 using a mobile communication terminal relay processor 803 (Step 218). The transmitted response is received to the mobile communication terminal system 151 via the data path 163, wide-area network 160, data path 164, gateway system 131, data path 132, data path 134, mobile communication base station system 135 and mobile network 173 (Step 219), and then displayed as the list of recorded programs thereby (Step 220).

Then, at a fourth phase, the communication service contractor selects a program to be transmitted from the displayed program list (Step 224).

Meanwhile, at a fifth phase, the inter-communication company link system 121 receiving the mobile communication terminal connection request establishes data transmission lines over a dedicated network 170 between the mobile communication company 130 and the fixed communication company 140 using an image transmission line establishment processor 802 (image transmission line establishment phase 221). Here, it is not necessary that the dedicated network is a network using a dedicated line. For example, the dedicated network may be a virtual private network established in a public network. In detail, the inter-communication company link system 121 transmits an image transmission line establishment request to a mobile-communication-side image transmitting system 133 and a fixed-communication-side image transmitting system 143 (Step 222). Upon receiving this request, the two image transmitting systems establish communication lines 171 and 172 over the dedicated network 170 (Step 223).

Then, at a sixth phase, the communication service contractor 150 requests transmission of an image of the program selected at the fourth phase from the broadcast image recording/viewing system 158 to the mobile communication terminal system 151 using the image transmission lines established at the fifth phase (recorded program image transmission phase 225). In detail, the mobile communication terminal system 151 transmits a recorded program image transmission request toward the inter-communication company link system 121 of the image edition meta information providing company 120 (Step 226). This recorded image transmission request is delivered via the wireless communication network 173, mobile communication base station system 135, data path 134, data path 132, gateway system 131, data path 164, wide-area network 160 and data path 163, and then received to the inter-communication company link system 121 of the image edition meta information providing company 120 (Step 227). Upon receiving the recorded image transmission request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded image transmission request, to acquire an access point fixed communication company ID number 808 and access point fixed communication terminal ID number 809 stored in the table. Then, the mobile communication terminal relay processor 803 sets the two ID numbers, which are the search results, as source information of the recorded image transmission request and transmits the recorded image transmission request toward the fixed communication terminal system 152 (Step 228).

The transmitted request is received to the fixed communication terminal system 152 via the data path 163, wide-area network 160, data path 165, gateway system 141, data path 142, data path 144, fixed communication base station system 145, data path 181, fixed communication network 180 and data path 182. Upon receiving the recorded image transmission request, the fixed communication terminal system 152 transmits this request toward the broadcast image recording/viewing system 158 according to a different protocol, and the transmitted request is received to the broadcast image recording/viewing system 158 via the data path 155 and data path 157 (Step 229).

Upon receiving this request, the broadcast image recording/viewing system 158 reads storage location information, not shown, which is a portion of meta information of a recorded image, from the recorded image meta information management table 902 and then reads the recorded image from a recorded image management unit 901 on the basis of the read storage location information. The broadcast image recording/viewing system 158 then transmits the read recorded image as a response to the recorded image transmission request transmitted according to the different protocol (Step 230). The fixed communication terminal system 152 receives the transmitted response via the data path 157 and data path 155 and transmits the received recorded image toward the fixed-communication-side image transmitting system 143 as data based on the recorded image transmission request. This transmitted recorded image is received to the fixed-communication-side image transmitting system 143 of the fixed communication company 140 via the data path 182, fixed communication network 180, data path 181, fixed communication base station system 145 and data path 144 (Step 231). Upon receiving the transmitted recorded image, the fixed-communication-side image transmitting system 143 transmits the received recorded image toward the mobile-communication-side image transmitting system 133 of the mobile communication company 130 (Step 232). The mobile-communication-side image transmitting system 133 receives the transmitted recorded image via the data path 142, gateway system 141, data path 172, dedicated network 170, data path 171, gateway system 131 and data path 132. Upon receiving this transmitted recorded image, the mobile-communication-side image transmitting system 133 transmits the received recorded image toward the mobile communication terminal system 151 transmitting the recorded image transmission request. The transmitted recorded image is received to the mobile communication terminal system 151 of the communication service contractor 150 via the data path 134, mobile communication base station system 135 and wireless communication network 173 (Step 233) and then displayed thereby. The above is the basic recording, connection and transmission processing flow among the processing flows of the information distribution system according to the present invention.

Figure 3:
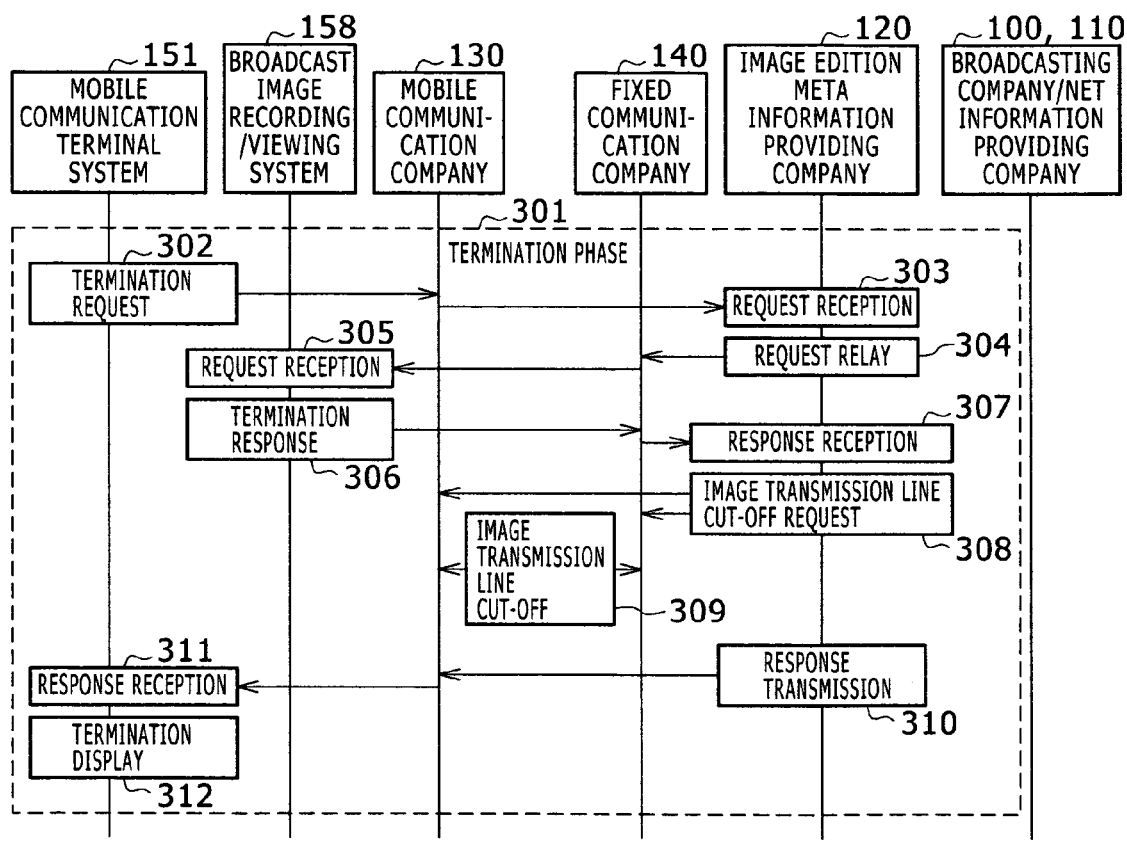
FIG. 3 is a termination processing flow chart of the first embodiment of the information distribution system according to the present invention.

Next, a description will be given of a termination phase of a termination processing flow of the first embodiment of the information distribution system according to the present invention with reference to FIG. 3. The communication service contractor 150 requests the present information distribution system, using the mobile communication terminal system 151, to terminate the image transmission and connection (termination phase 301). In detail, the mobile communication terminal system 151 transmits a termination request toward the inter-communication company link system 121 of the image edition meta information providing company 120 (Step 302). This termination request is delivered via the wireless communication network 173, mobile communication base station system 135, data path 134, data path 132, gateway system 131, data path 164, wide-area network 160 and data path 163, and then received to the inter-communication company link system 121 of the image edition meta information providing company 120 (Step 303). Upon receiving the termination request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the termination request, to acquire an access point fixed communication company ID number 808 and access point fixed communication terminal ID number 809 stored in the table. Then, the mobile communication terminal relay processor 803 sets the two ID numbers, which are the search results, as source information of the termination request and transmits the termination request toward the fixed communication terminal system 152 (Step 304). The transmitted request is received to the fixed communication terminal system 152 via the data path 163, wide-area network 160, data path 165, gateway system 141, data path 142, data path 144, fixed communication base station system 145, data path 181, fixed communication network 180 and data path 182. Upon receiving this request, the fixed communication terminal system 152 transmits a recorded image transmission termination request toward the broadcast image recording/viewing system 158 according to a different protocol, and the transmitted request is received to the broadcast image recording/viewing system 158 via the data path 155 and data path 157 (Step 305). Upon receiving the transmitted request, the broadcast image recording/viewing system 158 terminates the transmission of the recorded image. The broadcast image recording/viewing system 158 then transmits transmission termination information as a response to the recorded image transmission termination request transmitted according to the different protocol (Step 306). The fixed communication terminal system 152 receives the transmitted response via the data path 157 and data path 155 and transmits the received transmission termination information toward the inter-communication company link system 121 as a response to the termination request. This transmission termination response is delivered via the data path 182, fixed communication network 180, data path 181, fixed communication base station system 145, data path 144, data path 142, gateway system 141, data path 165, wide-area network 160 and data path 163 and then received to the inter-communication company link system 121 of the image edition meta information providing company 120 (Step 307).

Upon receiving the termination response, the inter-communication company link system 121 cuts off the data transmission lines established over the dedicated network 170 between the mobile communication company 130 and the fixed communication company 140 using an image transmission line cut-off processor 835. In detail, the inter-communication company link system 121 transmits an image transmission line cut-off request to the mobile-communication-side image transmitting system 133 and the fixed-communication-side image transmitting system 143 (Step 308). Upon receiving this request, the two image transmitting systems cut off the communication lines 171 and 172 established over the dedicated network 170 (Step 309).

Finally, the inter-communication company link system 121 transmits the termination response toward the mobile communication terminal system 151 of the communication service contractor 150 using the mobile communication terminal relay processor 803 (Step 310). The transmitted response is received to the mobile communication terminal system 151 via the data path 163, wide-area network 160, data path 164, gateway system 131, data path 132, data path 134, mobile communication base station system 135 and mobile network 173 (Step 311), and then displayed as termination completion thereby (Step 312).

The above is the first information distribution processing flow which is the first embodiment of the information distribution system according to the present invention.

Next, a detailed description will be given of a second information distribution processing flow of the information distribution system shown in FIG. 1, which is a second embodiment of the information distribution system according to the present invention.

Figure 4:
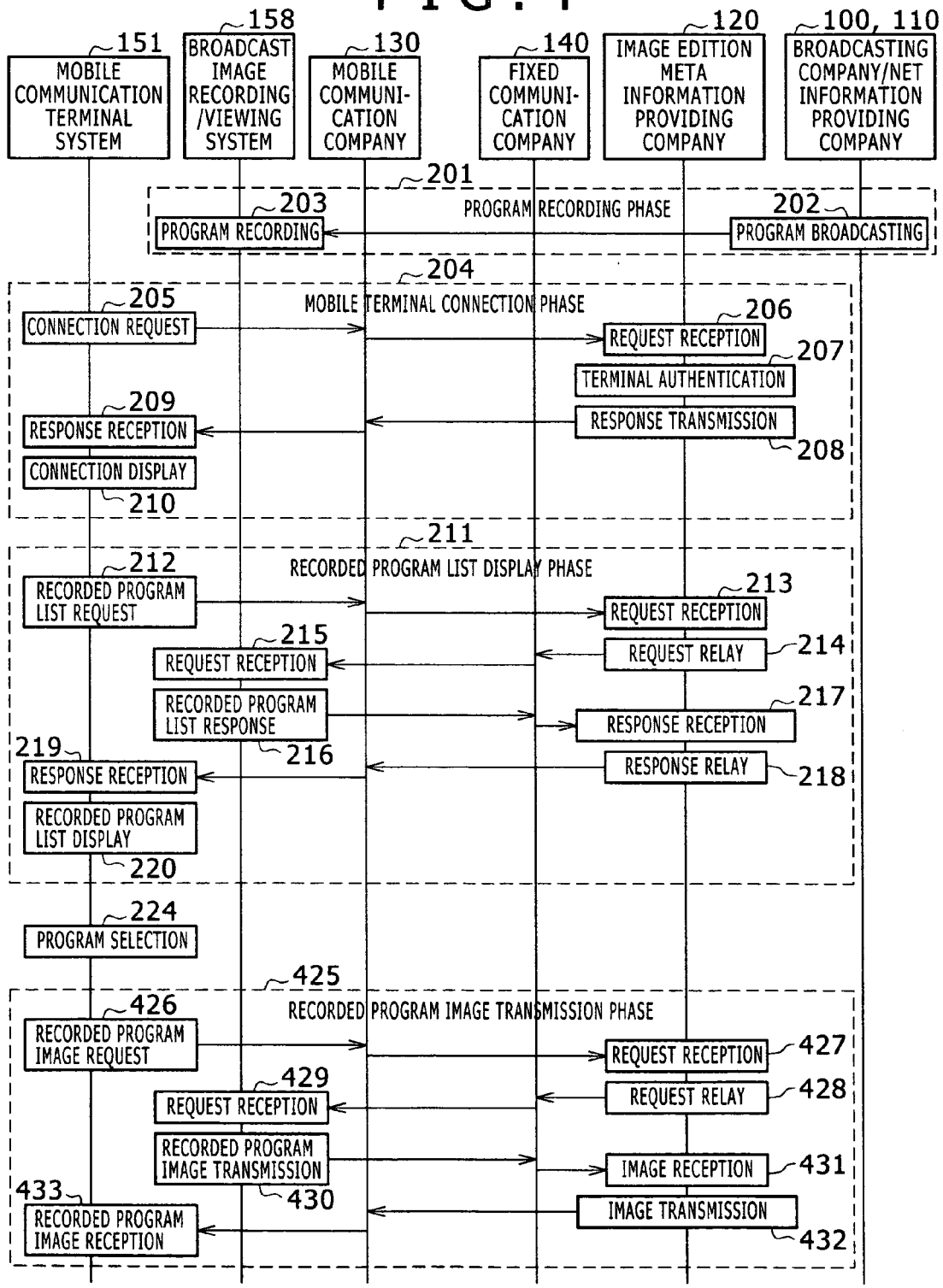
FIG. 4 is a recording, connection and transmission processing flow chart of a second embodiment of the information distribution system according to the present invention.

FIG. 4 shows the information distribution processing flow according to the second embodiment of the present invention. The second embodiment of the present invention is characterized in that no dedicated communication line for image transmission is required between the mobile communication company 130 and the fixed communication company 140. In contrast, the first embodiment of the present invention is on the premise that the data transmission lines are established over the dedicated network 170 between the mobile communication company 130 and the fixed communication company 140. The information distribution processing flow of the present embodiment will hereinafter be described in detail with reference to FIG. 4 and, as needed, FIG. 1, FIG. 8 and FIG. 9.

The second embodiment is similar in configuration to the above-described first embodiment. That is, the program recording phase 201, mobile communication terminal connection phase 204, recorded program list display phase 211 and transmission program selection step 224 in FIG. 4 are the same as those in the first embodiment and a description thereof will thus be omitted. In other words, the second embodiment is substantially the same in configuration as the first embodiment, with the exception of a recorded program image transmission phase 425. In detail, at the recorded program image transmission phase 425, the mobile communication terminal system 151 transmits a recorded program image transmission request toward the inter-communication company link system 121 of the image edition meta information providing company 120 (Step 426). This recorded image transmission request is delivered via the wireless communication network 173, mobile communication base station system 135, data path 134, data path 132, gateway system 131, data path 164, wide-area network 160 and data path 163, and then received to the inter-communication company link system 121 of the image edition meta information providing company 120 (Step 427). Upon receiving the recorded image transmission request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded image transmission request, to acquire an access point fixed communication company ID number 808 and access point fixed communication terminal ID number 809 stored in the table. Then, the mobile communication terminal relay processor 803 sets the two ID numbers, which are the search results, as source information of the recorded image transmission request and transmits the recorded image transmission request toward the fixed communication terminal system 152 (Step 428).

The transmitted request is received to the fixed communication terminal system 152 via the data path 163, wide-area network 160, data path 165, gateway system 141, data path 142, data path 144, fixed communication base station system 145, data path 181, fixed communication network 180 and data path 182. Upon receiving the recorded image transmission request, the fixed communication terminal system 152 transmits this request toward the broadcast image recording/viewing system 158 according to a different protocol, and the transmitted request is received to the broadcast image recording/viewing system 158 via the data path 155 and data path 157 (Step 429). Upon receiving this request, the broadcast image recording/viewing system 158 reads storage location information, not shown, which is a portion of meta information of a recorded image, from the recorded image meta information management table 902 and then reads the recorded image from the recorded image management unit 901 on the basis of the read storage location information.

Then, the broadcast image recording/viewing system 158 transmits the read recorded image as a response to the recorded image transmission request transmitted according to the different protocol (Step 430). The fixed communication terminal system 152 receives the transmitted response via the data path 157 and data path 155 and transmits the received recorded image toward the inter-communication company link system 121 as a response to the recorded image transmission request. This recorded image transmission response is delivered via the data path 182, fixed communication network 180, data path 181, fixed communication base station system 145, data path 144, data path 142, gateway system 141, data path 165, wide-area network 160 and data path 163 and then received to the inter-communication company link system 121 of the image edition meta information providing company 120 (Step 431). Upon receiving the recorded image transmission response, the inter-communication company link system 121 transmits this recorded image transmission response toward the mobile communication terminal system 151 of the communication service contractor 150 using the mobile communication terminal relay processor 803 (Step 432). The transmitted response is received to the mobile communication terminal system 151 via the data path 163, wide-area network 160, data path 164, gateway system 131, data path 132, data path 134, mobile communication base station system 135 and mobile network 173 (Step 433), and then displayed as the recorded image thereby.

As described above, the second embodiment of the present invention is not on the premise that the data transmission lines are established over the dedicated network 170 between the mobile communication company 130 and the fixed communication company 140. Therefore, it is possible to realize the image transmission more simply. The above is the second information distribution processing flow which is the second embodiment of the information distribution system according to the present invention.

Next, a detailed description will be given of a third information distribution processing flow of the information distribution system shown in FIG. 1, which is a third embodiment of the information distribution system according to the present invention.

Figure 5:
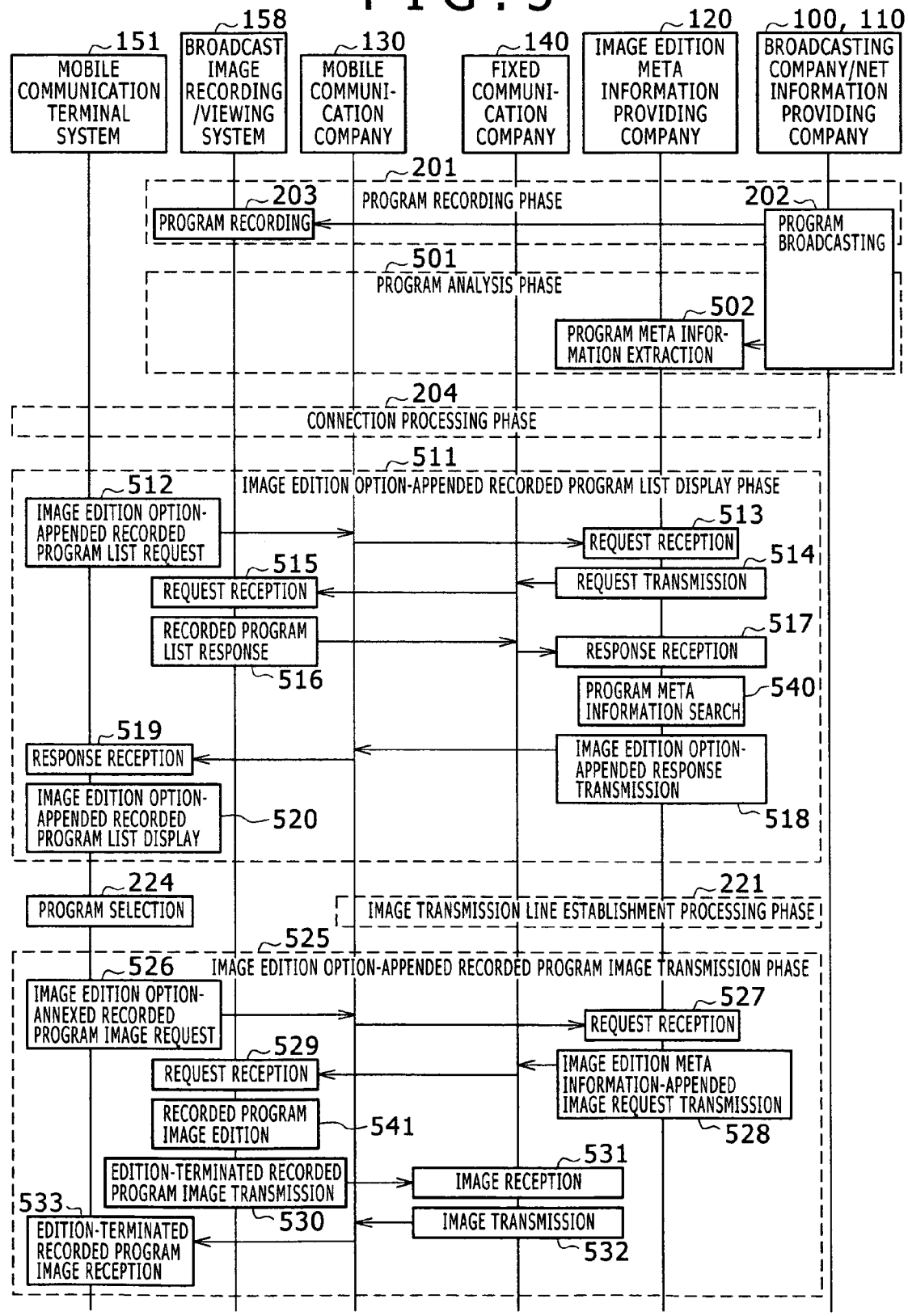
FIG. 5 is a recording, connection and transmission processing flow chart of a third embodiment of the information distribution system according to the present invention.

FIG. 5 shows the information distribution processing flow according to the third embodiment of the present invention. The third embodiment of the present invention is characterized in that a recorded image to be transmitted is edited and the resulting image is transmitted. In contrast, in the above-described first and second embodiments, the recorded image is transmitted without modification. The information distribution processing flow of the present embodiment will hereinafter be described in detail with reference to FIG. 5 and, as needed, FIG. 1, FIG. 8 and FIG. 9.

The first phase, or program recording phase 201, is the same as those in the above-stated first and second embodiments and a description thereof will thus be omitted. Meanwhile, independent of the first phase, the image edition meta information providing company 120 analyzes a broadcast program (program analysis phase 501). In detail, the image edition meta information providing company 120 receives and analyzes a broadcast program to extract meta information therefrom (Step 502). This step will hereinafter be described in detail with reference to FIG. 8. First, the image edition meta information providing company 120 receives a broadcast program from the broadcasting company 110 using an antenna 128 and the broadcast image receiving system 127. An image of the received program is delivered to the image edition meta information providing system 123 through a data path 129 and then stored in a broadcast image management unit 820 of the image edition meta information preparing system 126 therein. Then, the broadcast image stored in the broadcast image management unit 820 is analyzed and the analysis result is stored as broadcast image meta information in a broadcast image meta information management table 821.

Although a program name 822, a broadcast date 823, a keyword 824, and an advertisement name 825 appended to the program are indicated as the broadcast image meta information in FIG. 8, the contents of the meta information are not limited thereto. For example, in the case where the broadcast image corresponds to a news program, a start time/end time or start position/end position of each news item may also be a candidate for the meta information. In the news program, the important degree of each news item may also be a candidate for the meta information. To sum up, various meta information for use in edition of a recorded image to be described later is stored in the broadcast image meta information management table 821. Also, the meta information is manually or automatically analyzed and extracted from the received program image and then stored in the broadcast image meta information management table 821. Alternatively, meta information, managed and provided by a broadcast image meta information providing system 111 of the broadcasting company 110, may be transmitted under the condition of being appended to the broadcast image or over the wide-area network 160, and the transmitted meta information may be acquired by the image edition meta information providing company 120 and then stored in the broadcast image meta information management table 821. As described above, by executing this phase, the image edition meta information providing company 120 can recognize meta information of all broadcast images and prepare and provide meta information for image edition on the basis of the recognized meta information to meet desires of a contractor to be described later.

The subsequent connection phase is the same as those in the above-stated first and second embodiments and a description thereof will thus be omitted.

Then, the communication service contractor 150 requests display of a list of recorded programs using the mobile communication terminal system 151 (recorded program list display phase 511). The third embodiment of the present invention is characterized in that each program information in a recorded program list provided by the broadcast image recording/viewing system 158 can be displayed with an edition type providable by the image edition meta information providing company 120 being appended thereto as an option. For example, where a program item in the recorded program list is "Soccer tournament Japanese to Argentina match", it may be displayed as "Soccer tournament Japan to Argentina match Digest One-minute edition", Soccer tournament Japan to Argentina match Digest Three-minute edition", or Soccer tournament Japan to Argentina match Japan's goal edition". That is, various edition types providable by the image edition meta information providing company 120 can be displayed under the condition of being appended to the list display as options.

A detailed description will hereinafter be given of steps of the image edition option-appended recorded information list display phase 511. First, In detail, the mobile communication terminal system 151 transmits an image edition option-appended recorded program list request toward the inter-communication company link system 121 of the image edition meta information providing company 120 (Step 512). This option-appended recorded program list request is delivered via the wireless communication network 173, mobile communication base station system 135, data path 134, data path 132, gateway system 131, data path 164, wide-area network 160 and data path 163, and then received to the inter-communication company link system 121 of the image edition meta information providing company 120 (Step 513). Upon receiving the option-appended recorded program list request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded program list request, to acquire an access point fixed communication company ID number 808 and access point fixed communication terminal ID number 809 stored in the table. Then, the mobile communication terminal relay processor 803 sets the two ID numbers, which are the search results, as source information of the recorded program list request and transmits the recorded program list request toward the fixed communication terminal system 152 (Step 514). The transmitted request is received to the fixed communication terminal system 152 via the data path 163, wide-area network 160, data path 165, gateway system 141, data path 142, data path 144, fixed communication base station system 145, data path 181, fixed communication network 180 and data path 182. Upon receiving the recorded program list request, the fixed communication terminal system 152 transmits this request toward the broadcast image recording/viewing system 158 according to a different protocol, and the transmitted request is received to the broadcast image recording/viewing system 158 via the data path 155 and data path 157 (Step 515). Upon receiving this request, the broadcast image recording/viewing system 158 reads meta information including program names 903 and broadcast dates 904 of recorded images from the recorded image meta information management table 902. The broadcast image recording/viewing system 158 then transmits the read recorded image meta information as a response to the recorded program list request transmitted according to the different protocol (Step 516). The fixed communication terminal system 152 receives the transmitted response via the data path 157 and data path 155 and transmits the received recorded image meta information toward the inter-communication company link system 121 as a response to the recorded program list request. This recorded program list response is delivered via the data path 182, fixed communication network 180, data path 181, fixed communication base station system 145, data path 144, data path 142, gateway system 141, data path 165, wide-area network 160 and data path 163 and then received to the inter-communication company link system 121 of the image edition meta information providing company 120 (Step 517). Upon receiving the recorded program list response, the inter-communication company link system 121 runs an image edition meta information preparation processor 827. The image edition meta information preparation processor 827 searches the broadcast image meta information management table 821 and an image edition meta information management table 828 by utilizing, as keys, respective program names of a program list included in the recorded program list response, and prepares various meta information for image edition using the search results (Step 540).

The prepared image edition data can be prepared in various manners and expressed in various forms. For example, assume that the following records are stored in the image edition meta information management table 828.

(Contractor name, Program name, Viewing start position, Viewing end position, Number of views, Comment) =[(Image edition meta information providing company, "Soccer tournament final", 00:20:00, 00:23:00, –, "Japan's first goal"), (1)

(Image edition meta information providing company, "Soccer tournament final", 00:40:00, 00:43:00, –, "Japan's second goal"), (2)

(Contractor A, "Soccer tournament final", 00:10:00, 00:30:00, 1, "–") (3)

(Contractor B, "Soccer tournament final", 00:15:00, 00:25:00, 2, "–")] (4)

The first record (1) is meta information for image edition prepared by the image edition meta information providing company 120, which describes that a scene of Japan's first goal is present in an image period from 20 minutes to 23 minutes in a program name "Soccer tournament final Japan vs. Argentina match". The second record (2) is meta information for image edition prepared by the image edition meta information providing company 120, which describes that a scene of Japan's second goal is present in an image period from 40 minutes to 43 minutes in the program name "Soccer tournament final Japan vs. Argentina match". As will be described later in detail, the third record (3) is meta information for image edition provided from a contractor A, which represents that an image period from 10 minutes to 30 minutes in the program name "Soccer tournament final Japan vs. Argentina match" is viewed once.

The image edition meta information is prepared on the above assumption. The expression format of the image edition meta information is considered to be defined by a set of records of a pair of data (Sequence number, Recorded image name, Play start time, Play end time). According to this format, the meta information for edition of an image "Soccer tournament final Japan vs. Argentina match Japan's goal collection" is prepared as (Sequence number, Recorded image name, Play start time, Play end time)={(1, "Soccer tournament final", 00:20:00, 00:23:00, "Japan's first goal"), (2, "Soccer tournament final", 00:40:00, 00:43:00, "Japan's second goal")} using the records (1) and (2) in the image edition meta information management table 828.

Return to the processing flow. If the search for program meta information prepared as an option of the recorded image and the preparation of meta information for image edition are completed, the inter-communication company link system 121 transmits the option appended-recorded program list response to the mobile communication terminal system 151 of the communication service contractor 150 using the mobile communication terminal relay processor 803 (Step 518). The transmitted option appended-recorded program list response is received by the mobile communication terminal system 151 via the data path 163, wide-area network 160, data path 164, gateway system 131, data path 132, data path 134, mobile communication base station system 135 and mobile network 173 (Step 519), and then displayed as the list of recorded programs thereby (Step 520).

The subsequent program selection step 224 and image transmission line establishment phase 221 are the same as those in the above-stated first embodiment and a description thereof will thus be omitted.

Then, the communication service contractor 150 requests transmission of an image of the image edition option-appended program selected at the program selection step 224 from the broadcast image recording/viewing system 158 to the mobile communication terminal system 151 using the image transmission lines established at the image transmission line establishment phase 221 (image edition option-appended recorded program transmission phase 525).

In detail, the mobile communication terminal system 151 transmits an image edition option-appended recorded program image transmission request to the inter-communication company link system 121 of the image edition meta information providing company 120 (Step 526). This image edition option-appended recorded image transmission request is delivered via the wireless communication network 173, mobile communication base station system 135, data path 134, data path 132, gateway system 131, data path 164, wide-area network 160 and data path 163, and then received by the inter-communication company link system 121 of the image edition meta information providing company 120 (Step 527). Upon receiving the image edition option-appended recorded image transmission request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded image transmission request, to acquire an access point fixed communication company ID number 808 and access point fixed communication terminal ID number 809 stored in the table. Then, the mobile communication terminal relay processor 803 sets the two ID numbers, which are the search results, as source information of the recorded image transmission request and transmits an image edition meta information-appended recorded image transmission request appended with the image edition meta information prepared in association with the image to be transmitted, to the fixed communication terminal system 152 (Step 528). The transmitted request is received by the fixed communication terminal system 152 via the data path 163, wide-area network 160, data path 165, gateway system 141, data path 142, data path 144, fixed communication base station system 145, data path 181, fixed communication network 180 and data path 182.

Upon receiving the image edition meta information-appended recorded image transmission request, the fixed communication terminal system 152 transmits the received recorded image transmission request to the broadcast image recording/viewing system 158 according to a different protocol, and the transmitted request is received by the broadcast image recording/viewing system 158 via the data path 155 and data path 157 (Step 529). Upon receiving this request, the broadcast image recording/viewing system 158 reads storage location information, not shown, which is a portion of the meta information of the recorded image, from the recorded image meta information management table 902 and then reads the recorded image from the recorded image management unit 901 on the basis of the read storage location information. The broadcast image recording/viewing system 158 then transmits the read recorded image to the image editing system 156. At the same time, the fixed communication terminal system 152 transmits the image edition meta information included in the received image edition meta information-appended recorded image transmission request to the image editing system 156.

The image editing system 156 receives the recorded image from the broadcast image recording/viewing system 158 and the image edition meta information from the fixed communication terminal system 152 and edits the recorded image using the image edition meta information. By this editing process, the image "Soccer tournament Japan vs. Argentina match" is edited into the image "Soccer tournament Japan vs. Argentina match Japan's goal collection".

Finally, the image editing system 156 transmits the edition-processed recorded image to the fixed communication terminal system 152, as a response to the recorded image transmission request transmitted in accordance with the different protocol (Step 530). After receiving the response via the data path 157 and data path 155, the fixed communication terminal system 152 transmits the received edition-processed recorded image to the fixed-communication-side image transmitting system 143, as data transmission according to the image edition meta information-appended recorded image transmission request. The edition-processed recorded image transmission is received by the fixed-communication-side image transmission system 143 of the fixed communication company 140 via the data path 182, fixed communication network 180, data path 181, fixed communication base station system 145, and data path 144 (Step 531). After receiving the transmitted edition-processed recorded image, the fixed-communication-side image transmitting system 143 transmits the received edition-processed recorded image to the mobile-communication-side image transmitting system 133 of the mobile communication company 130 (Step 532). The mobile-communication-side image transmitting system 133 receives the transmitted edition-processed recorded image via the data path 142, gateway system 141, data path 172, dedicated network 170, data path 171, gateway system 131, and data path 132. After receiving the transmitted edition-processed recorded image, the mobile-communication-side image transmitting system 133 transmits the received edition-processed recorded image to the mobile communication terminal system 151 which has transmitted the image edition option-appended recorded image transmission request. The image edition option-appended recorded image is received by the mobile communication terminal system 151 of the communication service contractor 150 via the data path 134, mobile communication base station system 135, and wireless communication network 173 (Step 533), and is displayed as the edition-processed recorded image.

The image edition option-appended recorded program list display phase 511 prepares the image edition meta information using only the record of the image edition meta information management table. A description will now be given of another method for preparing image edition meta information, which allows an advertisement, which accompanies an image (or video), to be replaced with an advertisement suitable for the profile of the user.

When preparing the image edition meta information, an image edition meta information preparation processor 827 first reads meta information of a communication service contractor, which has transmitted the recorded image transmission request, from a communication service contractor meta information management table 804. The image edition meta information preparation processor 827 then reads meta information of an advertisement image included in a broadcast image corresponding to the recorded image, which has been requested to be transmitted, from a broadcast image meta information management table 821 of the broadcast image. Through a meta information combination determination processor 826, the image edition meta information preparation processor 827 then determines whether or not the combination of the read meta information of the advertisement image and the read meta information of the communication service contractor is appropriate. For example, if the advertisement image included in the broadcast image is associated with a beer advertisement of an A beverage company and the communication service contractor, which has transmitted the recorded image transmission request, is a minor, the meta information combination determination processor 826 determines that the combination is inappropriate and then prepares the image edition meta information by replacing the beer advertisement with a soft drink advertisement of a separated provided advertisement image meta information management system (not shown). Based on the provision of image edition meta information including the advertisement image meta information, a compensation for the watching of the advertisement image is given to the contractor, whereas an advertising cost calculation process 834 is performed to charge the advertisement provider for the advertisement fee. For example, the contractor may apply the compensation to the payment for the use of the system. As described above, the present invention manages meta information of service contractors or recorded or advertisement images and uses a combination thereof, thereby providing a high value-added service.

As described above, in the third embodiment, the preparation and provision of the image edition meta information of the recorded image to be transmitted is performed independently of the image edition process based on the meta information, thereby making it possible to provide and transmit a variety of image edition results without increasing the burden of copyrighted image usage fees.

We now complete the description of basic recording, connection, and transmission processing flows of the information distribution system according to the third embodiment of the present invention.

A detailed description will now be given of a fourth information distribution processing flow of the information distribution system shown in FIG. 1, which is a fourth embodiment of the information distribution system of the present invention.

Figure 6:
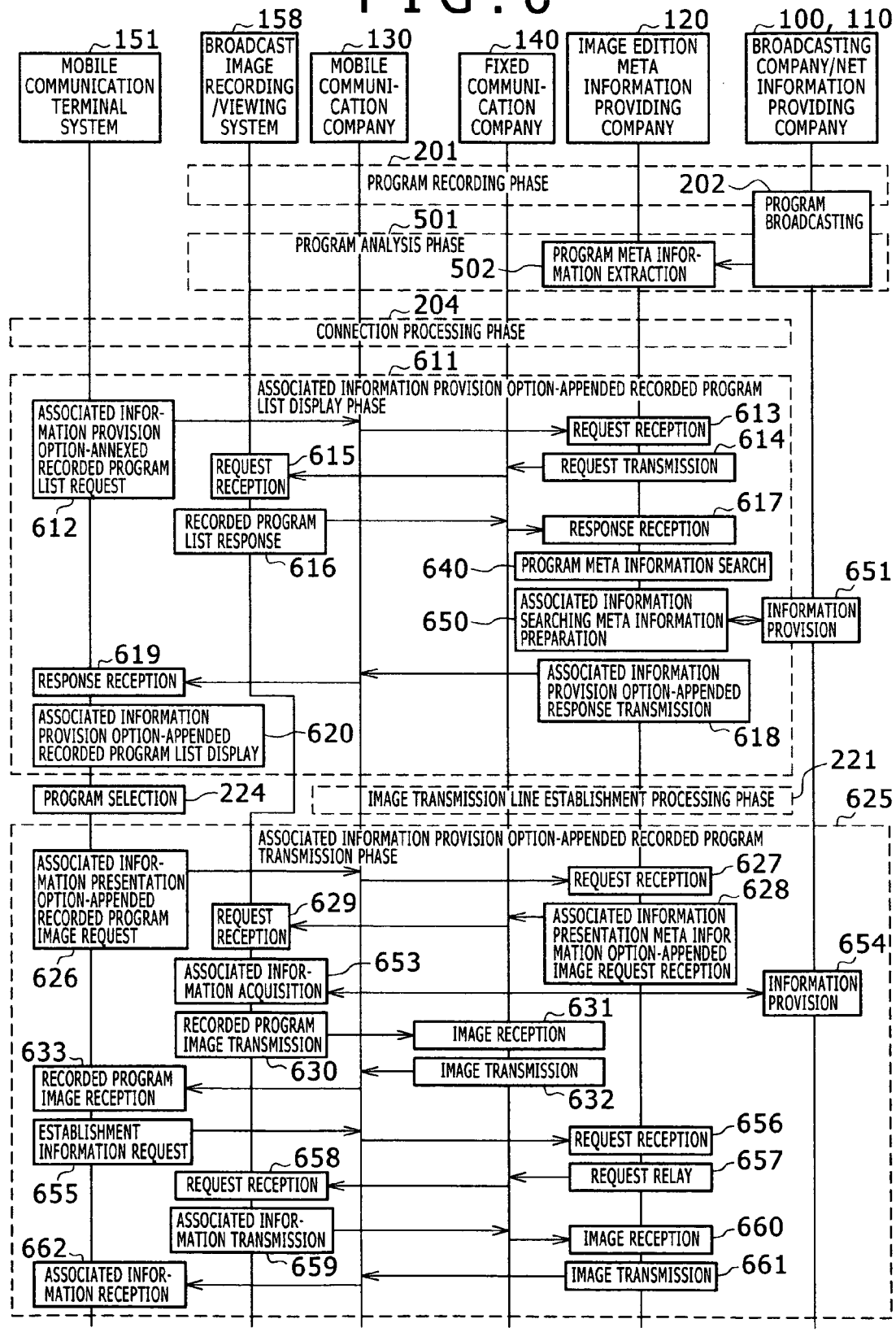
FIG. 6 is a recording, connection and transmission processing flow chart of a fourth embodiment of the information distribution system according to the present invention.

FIG. 6 shows an information distribution processing flow according to the fourth embodiment of the present invention. The fourth embodiment of the present invention is characterized by searching for net information associated with a recorded image to be transmitted, thereby making it possible to transmit an image accompanied by the retrieved net information. On the other hand, the first, second, and third embodiments simply provide the function to transmit the recorded image as a stand-alone image. The information distribution processing flow according to the fourth embodiment will now be described with reference to FIG. 6 in conjunction with FIGS. 1, 8 and 9 as needed.

A description of the program recording phase 201, which is the first phase, the program analysis phase 501, and the connection processing phase 204 is omitted herein since it is similar to that of the third embodiment.

The communication service contractor 150 then requests that a list of recorded programs be displayed using the mobile communication terminal system 151 (recorded program list display phase 511). The fourth embodiment is characterized in that each information item of the recorded program list provided by the broadcast recording/viewing system 158 is displayed by accompanying it by, as an option, an associated information item that can be provided by the image edition meta information providing company 120. For example, when a recorded program item "soccer tournament final Japan vs. Argentina match" is present, the listed program item is displayed by accompanying it by, as an option, an associated information item, such as a variety of associated net information or address information included in the net information, which can be provided by the image edition meta information providing company 120 (for example, "soccer tournament final Japan vs. Argentina match and soccer union official website" or "soccer tournament final Japan vs. Argentina match and soccer tournament host official website" is displayed). A detailed description will now be given of steps of the associated information provision option-appended recorded program list display phase 611. In detail, the mobile communication terminal system 151 first transmits an associated information provision option-appended recorded program list request to the communication company-related system 121 of the image edition meta information providing company 120 (Step 612). This option-appended recorded program list request is delivered via the wireless communication network 173, mobile communication base station system 135, data path 134, data path 132, gateway system 131, data path 164, wide-area network 160 and data path 163, and then received by the inter-communication company link system 121 of the image edition meta information providing company 120 (Step 613). Upon receiving the option-appended recorded program list request, the inter-communication company link system 121 runs the mobile communication terminal relay processor 803.

The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded program list request, to acquire an access point fixed communication company ID number 808 and access point fixed communication terminal ID number 809 stored in the table. Then, the mobile communication terminal relay processor 803 sets the two ID numbers, which are the search results, as source information of the recorded program list request and transmits the recorded program list request to the fixed communication terminal system 152 (Step 614). The transmitted request is received by the fixed communication terminal system 152 via the data path 163, wide-area network 160, data path 165, gateway system 141, data path 142, data path 144, fixed communication base station system 145, data path 181, fixed communication network 180 and data path 182. Upon receiving the recorded program list request, the fixed communication terminal system 152 transmits this request to the broadcast image recording/viewing system 158 according to a different protocol, and the transmitted request is received by the broadcast image recording/viewing system 158 via the data path 155 and data path 157 (Step 615). Upon receiving this request, the broadcast image recording/viewing system 158 reads meta information including program names 903 and broadcast dates 904 of recorded images from the recorded image meta information management table 902. The broadcast image recording/viewing system 158 then transmits the read recorded image meta information as a response to the recorded program list request transmitted according to the different protocol (Step 616). The fixed communication terminal system 152 receives the transmitted response via the data path 157 and data path 155 and transmits the received recorded image meta information to the inter-communication company link system 121 as a response to the recorded program list request. This recorded program list response is delivered via the data path 182, fixed communication network 180, data path 181, fixed communication base station system 145, data path 144, data path 142, gateway system 141, data path 165, wide-area network 160 and data path 163 and then received by the inter-communication company link system 121 of the image edition meta information providing company 120 (Step 617). Upon receiving the recorded program list response, the inter-communication company link system 121 runs an image edition meta information preparation processor 827. The image edition meta information preparation processor 827 searches the broadcast image meta information management table 821 by utilizing, as keys, respective program names of a program list included in the recorded program list response, and prepares various meta information for image edition using the search results (Step 640). Using the search results, the image edition meta information preparing processor 827 runs a net information search processor 811 of the net information search analysis system 124 to perform associated information search and meta data edition (Step 650).

Specifically, the net information search processor 811 accesses the net information providing system 101 (Step 651) and stores the access result information in a net information meta information management table 812 and a net information-associated information management table 816.

The following is a description of the net information meta information management table 812. This table stores meta information of associated information provided by the net information providing system on the network such as an associated information name 813, an associated information address 814 (for example, a Universal Resource Locator (URL)), and a keyword 815 (for example, a keyword included in the associated information). Of course, the table may also store other meta information.

The following is a description of the net information-associated information management table 816. This table stores and manages broadcast images, which are stored and managed by the broadcast image meta information management table 821 in the image edition meta information preparing system 126, and associated information of the net information which is stored and managed by the net information meta information management table 812. Specifically, the associated information name 817 in the net information-associated information management table 816 indicates an information name of the net information and is an information item that corresponds to the associated information name 813 in the net information meta information management table 812. The program name 818 in the net information-associated information management table 816 indicates a program name of the broadcast image and is an information item that corresponds to the program name 822 in the broadcast image meta information management table 821. The keyword 819 in the net information-associated information management table 816 indicates a keyword (or a concept), based on which the net information is associated with the broadcast image. The table 816 stores a corresponding (or matching) keyword which is selected from the keyword 815 in the net information meta information management table 812 and the keyword 824 in the broadcast image meta information management table 821.

Examples of the tables will now be described. The following is an example of the broadcast image meta information management table 821.

(program name, broadcast date, keyword, advertisement name)=("soccer tournament final", Jul. 20, 2006, "Soccer tournament Japanese to Argentina match", "ABC manufacturing company")

The following is an example of the net information meta information management table 812.

(associated information name, address, keyword)=("soccer tournament host official website", "http://www.ffff.com", "soccer, tournament, world youth championship")

The following is an example of the net information-associated information management table 816 that associates the above two information items.

(associated information name, program name, keyword)
=("soccer tournament host official website", "soccer tournament final", "soccer, tournament")

Based on the information search results, the net information search processor 811 prepares a various associated information option-appended image list and associated information provision meta information (i.e., meta information for use in providing associated information) (Step 650). Contents of the associated information provision meta information may be provided in a variety of formats. One example format is a set of (recorded image name, sequence number, associated information name, keyword). According to this format, associated information provision meta information of "soccer tournament final Japan vs. Argentina match" is written as (soccer tournament final, 1, "http://www.ffff.com", "soccer, tournament").

We now return to the processing flow. If the search for the associated information provision meta information, prepared as an option of the recorded image, and the edition of the associated information provision meta information are completed, the inter-communication company link system 121 transmits the associated information provision option appended-recorded program list response to the mobile communication terminal system 151 of the communication service contractor 150 using the mobile communication terminal relay processor 803 (Step 618). The transmitted option appended-recorded program list response is received by the mobile communication terminal system 151 via the data path 163, wide-area network 160, data path 164, gateway system 131, data path 132, data path 134, mobile communication base station system 135 and mobile network 173 (Step 619), and is then displayed as the associated information provision option-appended recorded program list thereby (Step 620).

The subsequent program selection step 224 and image transmission line establishment phase 221 are the same as those in the above-stated first embodiment and a description thereof will thus be omitted.

Then, the communication service contractor 150 requests transmission of an image of the associated information provision option-appended program selected at the program selection step 224 from the broadcast image recording/viewing system 158 to the mobile communication terminal system 151 using the image transmission lines established at the image transmission line establishment phase 221 (associated information provision option-appended recorded program transmission phase 625).

In detail, the mobile communication terminal system 151 transmits an associated information provision option-appended recorded program image transmission request to the inter-communication company link system 121 of the image edition meta information providing company 120 (Step 626). This image associated information provision option-appended recorded image transmission request is delivered via the wireless communication network 173, mobile communication base station system 135, data path 134, data path 132, gateway system 131, data path 164, wide-area network 160 and data path 163, and then received by the inter-communication company link system 121 of the image edition meta information providing company 120 (Step 627). Upon receiving the associated information provision option-appended recorded image transmission request, the inter-communication company link system 121 runs the mobile communication terminal relay processor 803. The mobile communication terminal relay processor 803 searches the communication service contractor meta information management table 804 in the inter-communication company link system 121 by utilizing, as keys, a mobile communication company ID number 806 and mobile communication terminal ID number 807 included in the recorded image transmission request, to acquire an access point fixed communication company ID number 808 and access point fixed communication terminal ID number 809 stored in the table. Then, the mobile communication terminal relay processor 803 sets the two ID numbers, which are the search results, as source information of the recorded image transmission request and transmits an associated information provision meta information-appended recorded image transmission request, prepared in association with the image to be transmitted, to the fixed communication terminal system 152 (Step 628). The transmitted request is received by the fixed communication terminal system 152 via the data path 163, wide-area network 160, data path 165, gateway system 141, data path 142, data path 144, fixed communication base station system 145, data path 181, fixed communication network 180 and data path 182. Upon receiving the associated information provision meta information-appended recorded image transmission request, the fixed communication terminal system 152 transmits the received recorded image transmission request to the broadcast image recording/viewing system 158 according to a different protocol, and the transmitted request is received by the broadcast image recording/viewing system 158 via the data path 155 and data path 157 (Step 629). Upon receiving this request, the broadcast image recording/viewing system 158 reads storage position information (not shown), which is part of the meta information of a recorded image, from a recorded image meta information management table 902, and reads a recorded image from a recorded image management unit 901 based on the read storage position information. The broadcast image recording/viewing system 158 transmits the read recorded image to the image edition system 156.

Along with the above-described transmission processing, the fixed communication terminal system 152, which has received the image edition meta information-appended recorded image transmission request, transmits associated information presentation meta information contained in the request to the net information searching/editing system 154. After receiving the associated information presentation meta information, the net information searching/editing system 154 accesses the net information providing system 101 via the fixed communication network 180 and wide-are network 160, and acquires associated information (Steps 653 and 654). The acquired associated information is sent to the image editing system 156 via the data path 190. The image editing system 156, which has received the recorded image from the broadcast image recording/viewing system 158, and has received the associated information from the net information searching/editing system 154, edits the recorded image. In accordance with this edition processing, the "Soccer tournament final Japanese to Argentina match and soccer tournament sponsor's official homepage" is edited and prepared, using the recorded information of "Soccer tournament final Japanese to Argentina match".

Finally, the image editing system 156 transmits the edition-processed recorded image to the fixed communication terminal system 152, as a response to the recorded image transmission request transmitted in accordance with the different protocol (Step 630). After receiving the response via the data path 157 and data path 155, the fixed communication terminal system 152 transmits the received edition-processed recorded image to the fixed-communication-side image transmitting system 143, as data transmission according to the image edition meta information-appended recorded image transmission request. The edition-processed recorded image transmission is received by the fixed-communication-side image transmission system 143 of the fixed communication company 140 via the data path 182, fixed communication network 180, data path 181, fixed communication base station system 145, and data path 144 (Step 631). After receiving the transmitted edition-processed recorded image, the fixed-communication-side image transmitting system 143 transmits the received edition-processed recorded image to the mobile-communication-side image transmitting system 133 of the mobile communication company 130 (Step 632). The mobile-communication-side image transmitting system 133 receives the transmitted edition-processed recorded image via the data path 142, gateway system 141, data path 172, dedicated network 170, data path 171, gateway system 131, and data path 132. After receiving the transmitted edition-processed recorded image, the mobile-communication-side image transmitting system 133 transmits the received edition-processed recorded image to the mobile communication terminal system 151 which has transmitted the image edition option-appended recorded image transmission request. The image edition option-appended recorded image is received by the mobile communication terminal system 151 of the communication service contractor 150 via the data path 134, mobile communication base station system 135, and wireless communication network 173 (Step 633), and is displayed as the edition-processed recorded image.

In the above description, the type, in which associated information itself is added to the edition-processed recorded image, has been described. Another method may be conceived, in which the net information searching/editing system 154 stores search result net information for preservation thereof, and adds the address of the stored associated information to the edition-processed recorded image. In this case, after view of the transmitted image, the mobile communication terminal 151 requests transmission of the associated information, if necessary (Step 655). The request is received by the inter-communication link system 121 of the image edition meta information company 120 via the wireless communication network 173, mobile communication company 130, and wide-area network 160. The inter-communication company link system 121 relays the associated information transmission request (Step 657). The request is received by the net information searching/editing system 154 via the wide-area network 160, fixed communication company 140, and fixed communication network 180 (Step 658). The net information searching/editing system 154 reads the associated information stored therein and managed thereby, and transmits the read associated information as a response to the request (Step 659). The response is received by the mobile communication terminal system 151 after flowing backwardly along the paths used for the transmission of the request, and is then displayed as the associated information (Steps 660 to 662).

As described above, the fourth embodiment of the present invention is characterized in that provision of information associated with an object to be transmitted, namely, a recorded image, is possible in accordance with preparation and provision of associated information presentation meta information associated with the recorded image to be transmitted. The above is the basic recording, connection, and transmission processing flow of the information distribution system according to the fourth embodiment of the present invention.

Next, a detailed description will be given of a fifth information distribution processing flow of the information distribution system shown in FIG. 1, which is a fifth embodiment of the information distribution system according to the present invention.

Figure 7:
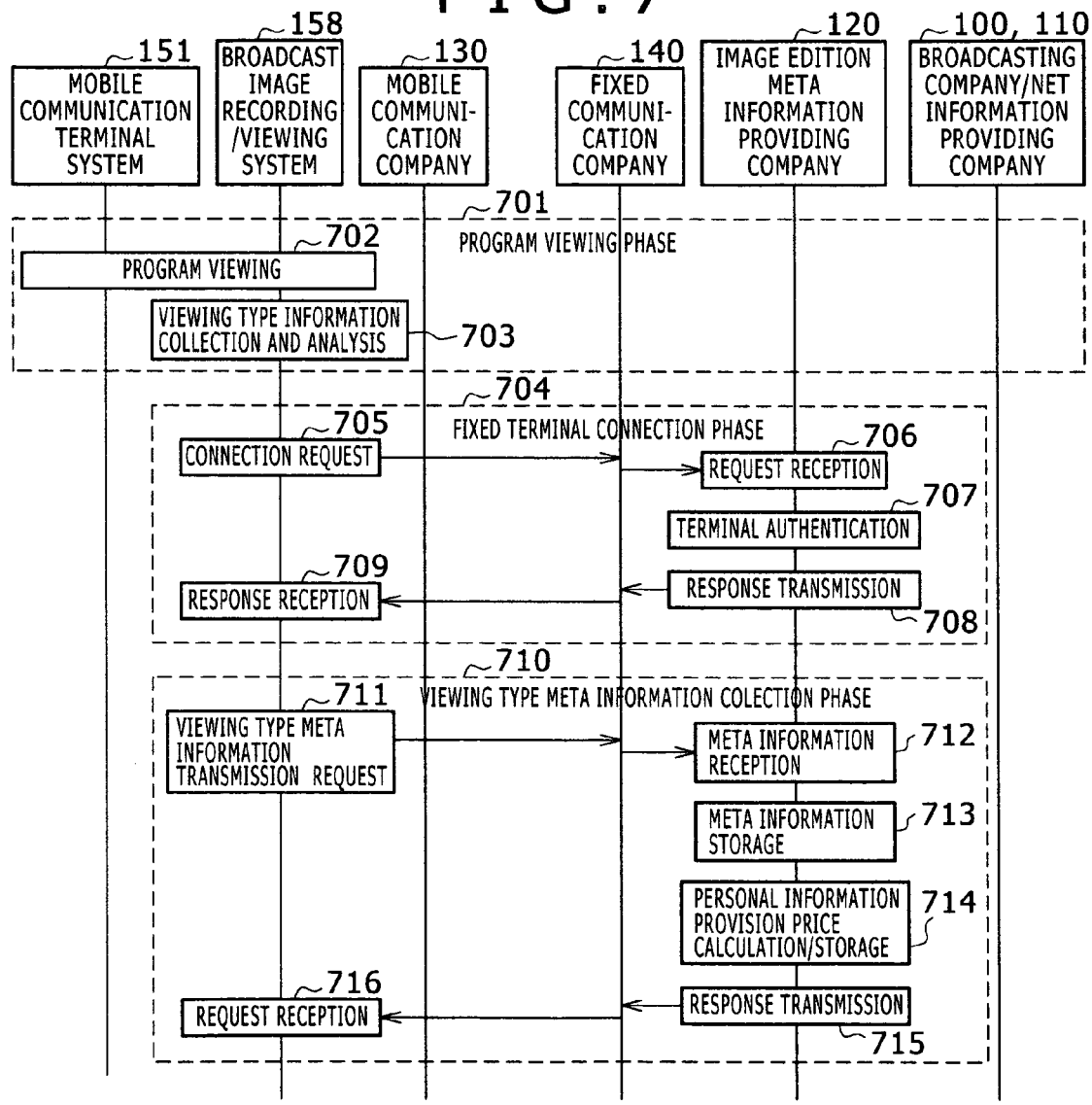
FIG. 7 is a viewing type meta information collection processing flow chart of a fifth embodiment of the information distribution system according to the present invention.

The information distribution flow according to the fifth embodiment of the present invention is shown in FIG. 7. The fifth embodiment of the present invention is characterized in that the broadcast image recording/viewing system 150 acquires numeric viewing type meta information by analyzing the viewing type of the recorded image stored in the system, and transmits the view type meta information to the image edition meta information providing company 120, in order to enable the image edition meta information providing company to prepare image edition meta information, using the viewing type meta information. In accordance with this method, it is possible to prepare high value-added image edition meta information by, for example, preparing a highlight image at a portion of the broadcast image exhibiting a high frequency of viewing. In this connection, there is no special description in association with preparation of image edition meta information. Hereinafter, the information distribution processing flow according to this embodiment will be described in detail with reference to FIG. 7, along with FIGS. 1, 8, and 9, if necessary.

First, at a first phase, the broadcast image recording/viewing system 158 acquires meta information as to the viewing type of the recorded program (program viewing phase 701). In detail, the communication service contractor 150 views the recorded image of the broadcast image recording/viewing system 158 (Step 702). In this case, the appliance used for practical viewing is not limited to the broadcast image recording/viewing system 158. As illustrated in the first embodiment, etc., it is possible to implement the type in which the recorded image of the broadcast image recording/viewing system 158 is viewed using the mobile communication terminal, via a network. Thereafter, the broadcast image recording/viewing system 158 runs a viewing type analysis processor 909, to analyze the viewing type, and thus, acquires viewing type meta information such as a program name 906, a viewing start position 907, a viewing end position 908, the number of views, a fast forward start position, a fast forward end position, a rewind start position, a rewind end position, etc. for every recorded image, and stores the information in a viewing type meta information table 905 (Step 703).

Then, at a second phase, the communication service contractor 150 performs a connection to the present information distribution system using the fixed communication terminal system 152 (fixed communication terminal connection phase 704). In detail, the fixed communication terminal system 152 transmits a connection request to an inter-communication company link system 121 of the image edition meta information providing company 120 (Step 705). This connection request is delivered via a fixed communication network 180, a fixed communication base station system 145, a data path 144, a data path 142, a gateway system 141, a data path 165, a wide-area network 160, and a data path 163, and then received by the inter-communication company link system 121 of the image edition meta information providing company 120 (Step 706). Upon receiving the connection request, the inter-communication company link system 121 runs a mobile and fixed communication terminal authentication processor 801 to perform a terminal authentication (Step 707).

The mobile and fixed communication terminal authentication processor 801 searches a communication service contractor meta information management table 804 in the inter-communication company link system 121 by utilizing, as keys, a fixed communication company identification (ID) number 808 and fixed communication terminal ID number 809 included in the connection request, to acquire fixed communication terminal system authentication information, which is a portion of contractor meta information 810 stored in the table, and authenticates the fixed communication terminal system using the acquired authentication information. Various conventional methods, including a public key certificate, are applicable to the authentication information and no further description thereof will thus be given.

If this authentication process is completed, the inter-communication company link system 121 transmits the authentication result to the fixed communication terminal system 152 as a response to the connection request (Step 708). The transmitted response is received by the fixed communication terminal system 152 via the data path 163, wide-area network 160, data path 165, data path 142, data path 144, fixed communication base station system 145 and fixed communication network 180 (Step 709), and whether the connection has been successfully performed is displayed thereby.

If the connection has been successfully performed, at a third phase, the communication service contractor 150 requests the transmission of the viewing-type meta information using the fixed communication terminal system 152 (viewing type meta information collection phase 710). In detail, the fixed communication terminal system 152 transmits a viewing-type meta information transmission request to the inter-communication company link system 121 of the image edition meta information providing company 120 (Step 711). This viewing-type meta information transmission request is delivered via the fixed communication network 180, fixed communication base station system 145, data path 144, data path 142, gateway system 141, data path 165, wide-area network 160 and data path 163, and then received by the inter-communication company link system 121 of the image edition meta information providing company 120 (Step 712). Upon receiving the viewing-type meta information transmission request, the inter-communication company link system 121 runs a viewing-type meta information storage processor 836. The viewing-type meta information storage processor 836 utilizes, as keys, a contractor name 829 included in the viewing-type meta information transmission request, and stores the viewing-type meta information (e.g., a program name 830, a viewing start position 831, and a viewing end position 832, etc.) in the image edition meta information management table 828 included in the image edition meta information providing system 123 (Step 713).

Then, the viewing-type meta information storage processor 836 runs a personal information provision price calculation processor 833, computes the costs of personal information (i.e., viewing type meta information) provision, and adds the computed costs to each contractor as an incentive (Step 714). The added costs are used to deduct some charges from a total charge assessed to the contractor who uses the system (not shown).

Finally, the inter-communication company link system 121 transmits a response to the viewing-type meta information transmission request to the fixed communication terminal 152 (Step 715). The transmitted response is received by the fixed communication terminal system 152 via the data path 163, wide-area network 160, data path 165, data path 142, data path 144, fixed communication base station system 145 and fixed communication network 180 (Step 716).

As described above, the present invention collects viewing-type meta information of recorded images of each contractor, such that it increases a viewing rate associated with a broadcast time, and can efficiently create the image edition meta information. The information distribution processing flow according to the fifth preferred embodiment of the present invention has been completed disclosed as described above.

As apparent from the description given in conjunction with the above embodiments, the present invention can be realized as an image distribution system constituted by a mobile telephone, an Internet service providing company, and a television video recorder. Accordingly, it is apparent that the present invention is applicable to broad fields including amusement and learning, in addition to office works or company business works requiring inputting of information using an IT appliance.

What is claimed is:

1. An information distribution system comprising:
   a broadcast image distribution system for transmitting a broadcast image;
   a broadcast image recording/viewing system for receiving the transmitted broadcast image, and recording the received broadcast image as a recorded image;
   an image editing system for editing the recorded image;
   a communication network;
   a communication base station connected to the communication network, to provide communication services;
   a communication terminal system connected to the communication network, to receive the communication services; and
   an image edition meta information providing system connected to the communication network, the image edition meta information providing system including an image edition meta information management table, to store predetermined meta information as to edition of the broadcast image, and providing the predetermined meta information after reading the predetermined meta information from the table on the communication network,
   wherein the broadcast image recording/viewing system is connected to the communication network,
   the image editing system is connected to the communication network,
   the communication terminal system transmits a recorded image transmission request to the broadcast image recording/viewing system via the communication network,
   after receiving the recorded image transmission request, the broadcast image recording/viewing system transmits the transmission-requested recorded image to the image editing system,
   after receiving the recorded image transmission request, the broadcast image recording/viewing system transmits, to the image edition meta information providing system, an image edition meta information transmission request for requesting the image edition meta information providing system to transmit image edition meta information corresponding to the transmission-requested recorded image to the image editing system,
   after receiving the image edition meta information transmission request, the image edition meta information providing system transmits the transmission-requested image edition meta information to the image editing system, and after receiving the transmitted recorded image and the transmitted image edition meta information, the image editing system edits the received recorded image, based on the received image edition meta information, and transmits a resultant edited image obtained as a result of the edition to the communication terminal system, as a response to the recorded image transmission request.

2. The information distribution system according to claim 1, wherein the predetermined meta information as to edition of the broadcast image includes at least one of position information and time information associated with one or plural image portions of the image, the position information and time information specifying the associated image portion or image portions.

3. The information distribution system according to claim 1,
wherein one or plural broadcast image recording/viewing systems for recording the received broadcast image as a recorded image are present,
when the recorded image is viewed by a user, the one broadcast image recording/viewing system or each of the plural broadcast image recording/viewing systems collects, as predetermined viewing type meta information as to type of viewing, viewing type meta information including at least one of viewing start position, viewing end position, number of views, fast forward start position, fast forward end position, rewind start position, and rewind end position, and includes a viewing type meta information management table for storing the collected viewing type meta information,
the one broadcast image recording/viewing system or each of the plural broadcast image recording/viewing systems transmits, to the image edition meta information providing system, the viewing type meta information read from the viewing type meta information management table via the communication network,
after receiving the transmitted viewing type meta information, the image edition meta information providing system sequentially stores the received viewing type meta information in the image edition meta information management table,
after storing the viewing type meta information, the image edition meta information providing system pays to a user providing the viewing type meta information for the provision of the information, and
wherein, after storing the viewing type meta information, the image edition meta information providing system executes predetermined image edition meta information preparation processing, using one or plural viewing type meta information pieces of the image edition meta information management table, to prepare predetermined meta information as to edition of the broadcast image.

4. The information distribution system according to claim 1,
wherein the transmitted broadcast image additionally includes one or plural advertising images,
the image edition meta information providing system includes a broadcast image meta information management table including, as the predetermined meta information, the broadcast image meta information and the meta information of the additional advertising image or images for each broadcast image, in addition to the image edition meta information management table,
the image edition meta information providing system includes a communication service contractor meta information management table for storing meta information including at least one of a sex and an age of a communication service contractor associated with the communication terminal system,
after receiving the recorded image transmission request, the image edition meta information providing system reads, from the communication service contractor meta information management table, meta information of the communication service contactor associated with the communication terminal system, from which the recorded image transmission request has been transmitted,
the image edition meta information providing system reads the meta information of the advertising image or images from the broadcast image meta information management table for the broadcast image corresponding to the transmission-requested recorded image,
the image edition meta information providing system determines whether or not the meta information of the read advertising image or images and the meta information of the communication service contactor are in an appropriately combined state, and
the image edition meta information providing system executes predetermined image edition meta information preparation processing, using a result of the determination executed by the meta information combination determination processor, to prepare predetermined meta information associated with the broadcast images.

* * * * *